United States Patent
Mori et al.

(10) Patent No.: US 6,250,807 B1
(45) Date of Patent: Jun. 26, 2001

(54) HYDRODYNAMIC TYPE BEARING AND HYDRODYNAMIC TYPE BEARING UNIT

(75) Inventors: Natsuhiko Mori; Kazuo Okamura, both of Mie-ken (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 09/391,594

(22) Filed: Sep. 8, 1999

(30) Foreign Application Priority Data

Sep. 10, 1998 (JP) .................................. 10-257116
Apr. 16, 1999 (JP) .................................. 11-110017

(51) Int. Cl.⁷ .................................................. F16C 32/06
(52) U.S. Cl. .................................... 384/100; 384/107
(58) Field of Search .................................... 384/100, 107, 384/111, 112, 113, 114, 121, 123

(56) References Cited

U.S. PATENT DOCUMENTS

| | | | |
|---|---|---|---|
| 3,445,148 | * 5/1969 | Harris et al. | 384/279 |
| 5,127,744 | * 7/1992 | White et al. | 384/112 |
| 5,357,162 | * 10/1994 | Aiyoshizawa et al. | 384/112 X |
| 5,683,183 | * 11/1997 | Tanaka et al. | 384/100 |
| 5,704,718 | * 1/1998 | Mori et al. | 384/279 |
| 5,810,479 | * 9/1998 | Miyasaka et al. | 384/107 |
| 5,941,646 | * 8/1999 | Mori et al. | 384/279 |

* cited by examiner

Primary Examiner—Thomas R. Hannon
(74) Attorney, Agent, or Firm—Arent Fox Kintner Plotkin & Kahn, PLLC

(57) ABSTRACT

A thrust bearing section (14) is constituted by one bearing end face (11f1) of a hydrodynamic type oil-impregnated sintered bearing (11) and a flange portion (13a) provided on a rotating shaft (13). The squareness between the bearing end face (11f1) and the bearing inner periphery (11h) is set within 3 $\mu$m, and the squareness between the flange portion (13a) and the outer periphery of the rotating shaft (13) is set within 2 $\mu$m. The bearing bore diameter d and the bearing length L of the hydrodynamic type oil-impregnated sintered bearing are set as $L \leq 1.2\,d$, and a radial bearing surface (11b) is arranged at one place on the bearing inner periphery (11h).

13 Claims, 16 Drawing Sheets

HYDRODYNAMIC TYPE BEARING AND HYDRODYNAMIC TYPE BEARING UNIT

BACKGROUND OF THE INVENTION

1. Field of the Invention

The invention relates to a hydrodynamic type bearing, particularly a hydrodynamic type oil-impregnated sintered bearing, and to a hydrodynamic type bearing unit employing the same. Hydrodynamic type oil-impregnated sintered bearings are especially suited to bearings in use for information equipment, i.e., bearings for disc drives in optical disc devices including DVD-ROMs and DVD-RAMs, magneto-optical disc devices including MOs, and magnetic disc devices including HDDs and high capacity floppy disc drives (FDDS) such as HiFDs and Zips, or bearings for polygon scanner motors in LBPs and the like. In particular, hydrodynamic type oil-impregnated sintered bearings are suitably applied to bearings in thinner models of motors.

2. Description of the Prior Art

Spindle motors for the information equipment mentioned above are required for further improvements in high-speed rotational accuracy, higher speeds, lower costs, lower noise, and the like. One of the component parts determining these performance requirements is a bearing for supporting the spindle of a motor. In recent years, studies have been made on the use of a hydrodynamic type bearing, especially of a so-called hydrodynamic type oil-impregnated sintered bearing, as such bearing. In a hydrodynamic type oil-impregnated sintered bearing, the bearing body of sintered metal is impregnated with lubricating oil or lubricating grease, and a lubricating film is formed in a bearing clearance by means of the hydrodynamic action of hydrodynamic pressure generating grooves provided in the bearing surface, so as to support a spindle without contact. This hydrodynamic type oil-impregnated sintered bearing, having the features of high rotational accuracy, low noise and the like despite of its low costs, appears to well meet the aforesaid performance requirements.

FIG. 12 shows an example of a spindle motor in an optical disc device, employing a hydrodynamic type oil-impregnated sintered bearing 1. As shown in the figure, this spindle motor comprises the hydrodynamic type oil-impregnated sintered bearing 1, a housing 2 for containing the bearing 1, a rotating shaft 3 supported by the bearing 1, a turntable 5 and a damper 6 for supporting and fixing an optical disc 4, and a motor section M composed of a stator 7a and a rotor 7b. The spindle motor is configured so that energizing the stator 7a brings a rotor case 8 integrated with the rotor 7b, the turntable 5, the optical disc 4, and the damper 6 into integral rotation.

The hydrodynamic type oil-impregnated sintered bearing 1 is composed of a porous bearing body formed in a thick cylindrical shape, and oil stored in the pores of the bearing body by means of the impregnation with lubricating oil or lubricating grease. In the inner periphery of the bearing body, a pair of bearing surfaces opposed to the outer periphery of the rotating shaft via bearing clearances are formed so as to be axially separated from each other. In each bearing surface are formed hydrodynamic pressure generating grooves slanting against an axial direction.

As shown in FIGS. 12 and 13, a thrust load on the rotating shaft 3 is supported by a thrust bearing 9 arranged at the bottom of the housing 2. The thrust bearing 9 typically has a configuration (so-called a pivot bearing) in which the spherical shaft end thereof slides on a resin washer 9a having high lubricity provided at the bottom of the housing 2.

The pivot bearing, however, may suffer a change in shaft position with lapse of time due to a recess in the washer 9a created by elastic deformation, plastic deformation, deformation from friction, and the like of the washer 9a. The change in shaft position cause variations in disc position in the cases of HDD devices, and variations in mirror position in the cases of polygon scanner motors in LBPS, greatly affecting the motor performance. As measures against this, the washer 9a could be formed of metal material or ceramic material; in such case, however, the shaft will be worn out to turn the spherical surface of the shaft end into a flat surface, possibly producing the problems of a change in shaft position, a rise in torque, fluctuations in torque, and the like.

Moreover, in recent years, the spindle motors are often required for thinner models in view of the mounting of optical disc devices and HDD devices on notebook type computers and the like, while the configuration that the bearing surfaces 1b are arranged axially at two places as described above has a limit in obtaining thinner models. As shown in FIG. 14 for example, a thinner model can be obtained by arranging the bearing surface 1b at only one place. This produces, however, the problem of a decrease in rigidity with respect to moment loads. In other words, since the rotating shaft 3 at the portion projecting from the bearing 1 is subjected to eccentric loads from the rotor case 8 having the rotor magnet 7b fixed thereto, the disc 4, the turntable 5, the clamper 6, and the like, it is feared that the accuracy in shaft run-out might be deteriorated by the moment loads.

Such hydrodynamic type bearing has hydrodynamic pressure generating grooves of herringbone type, spiral type, or the like for generating a hydrodynamic pressure formed in the inner periphery (radial bearing surface) of its almost-cylindrical-shaped sleeve material. A conventional method for forming hydrodynamic pressure generating grooves is known in which a rod-shaped jig, holding a plurality of balls harder than the bearing material arranged circumferentially at equal intervals, is inserted into the inner periphery of the bearing material, and the jig is rotated and fed to put the balls into spiral movements while pressing the balls against the inner periphery of the material to form by rolling (plastic working) the hydrodynamic pressure generating grooves (Japanese Patent No. 2541208).

In such hydrodynamic type bearing, a thrust bearing surface having hydrodynamic pressure generating grooves is sometimes provided on an end face of the bearing or a surface opposed thereto of the spindle, in order to non-contact support the spindle in a thrust direction. These hydrodynamic pressure generating grooves in the thrust bearing surface are typically formed by pressing.

The above-described rolling of hydrodynamic pressure generating grooves, however, creates heaving at regions adjacent to the hydrodynamic pressure generating grooves in working. The heaving must be removed by a lathe or a reamer (Japanese Patent Laid-Open Publication No.Hei 8-232958), complicating the processes. Besides, in the removing, positioning need to be performed with end faces of the bearing pressed against the jig; therefore, the end faces of the bearing must have been finished with a high degree of accuracy, and the accuracy of the end faces should be maintained in the removing as well, making the work troublesome.

Moreover, since the thrust bearing surface is worked in a separate process from that of the radial bearing surface, a bearing surface formed in the preceding process may decrease in accuracy during the following process, producing a difficulty in quality control.

SUMMARY OF THE INVENTION

In view of the foregoing, an object of the present invention is to provide a hydrodynamic type bearing, particularly a hydrodynamic type oil-impregnated sintered bearing, being capable of maintaining a desired bearing performance for a long period of time and realizing thinner models without producing a decrease in the accuracy of shaft run-out and the like.

Another object of the present invention is to simplify the fabrication processes of a hydrodynamic type bearing having a radial bearing surface and a thrust bearing surface, and to facilitate the quality control therein.

To achieve the foregoing objects, the present invention is to provide a hydrodynamic type oil-impregnated sintered bearing unit comprising a shaft and a hydrodynamic type oil-impregnated sintered bearing including a bearing body formed of sintered metal, the bearing body being provided with a radial bearing surface opposed to the outer periphery of the shaft via a bearing clearance and being impregnated with oil, the hydrodynamic type oil-impregnated sintered bearing supporting the shaft without contact by means of the hydrodynamic action produced on the radial bearing surface in the relative rotation between the shaft and the bearing body, wherein: at least one bearing end face of the hydrodynamic type oil-impregnated sintered bearing and a flange portion provided on the shaft constitute a thrust bearing section; and the squareness between the aforesaid one bearing end face and the bearing inner periphery and the squareness between the flange portion and the outer periphery of the shaft are controlled to a tolerance that the aforesaid one bearing end face and the flange portion are kept out of uneven contact with each other in the relative rotation between the shaft and the bearing body.

The thrust bearing section of the aforesaid constitution secures surface contact between the rotating side and the stationary side, so that the pressure in the contacting surface can be decreased to prevent wear, thereby avoiding a change in shaft position resulting from the abrasive deformation of the washer as that in a pivot bearing. Besides, the surface contact improves rigidity with respect to moment loads as compared with the point contact in a pivot bearing.

In a thrust bearing section, an insufficient accuracy in a bearing end face or in a flange portion may put the flange portion into not surface contact but uneven contact (point contact or line contact) with the bearing end face. The uneven contact yields a larger torque loss and causes fluctuations in torque, making it impossible to obtain a high rotational accuracy required of information equipment. In this case, even when the bearing end face is provided with a hydrodynamic pressure generating groove so as to keep the thrust bearing section out of contact, the insufficient hydrodynamic effect causes contact and wear between the bearing end face and the flange portion, precluding the improvement in rotational accuracy and durability.

Thus, in the present invention, the squareness between at least one bearing end face and the bearing inner periphery constituting a thrust bearing section and the squareness between the flange portion and the outer periphery of the shaft (in particular, the outer periphery of the shaft opposed to the radial bearing surface) are controlled to a tolerance that the aforesaid one bearing end face and the flange portion are kept out of uneven contact with each other in the relative rotation between the shaft and the bearing body.

Here, in the cases, e.g., where the squareness between the bearing end face and the bearing inner periphery is 4 $\mu$m or greater and the squareness between the flange portion and the outer periphery of the shaft is 3 $\mu$m or greater, the flange portion may be in not surface contact but uneven contact with the bearing end face. Therefore, the squareness between the bearing end face and the bearing inner periphery is set within 3 $\mu$m, and the squareness between the flange portion and the outer periphery of the shaft is set within 2 $\mu$m.

In this connection, the "squareness" as employed herein refers to, in the combination of a plane to be a standard and a planar portion to be perpendicular thereto, the magnitude that the planar portion to be perpendicular deviates from a geometrical plane perpendicular to the standard plane.

In a conventional hydrodynamic type oil-impregnated sintered bearing, the bearing end faces thereof are not sufficient in accuracy (the squareness of the bearing end faces relative to the bearing inner periphery is in the order of 10 $\mu$m), and it is difficult to mass-produce a bearing body having an accuracy in the aforesaid numerical range. Measures thereto include a method in which, after a bearing is fixed to a housing, the bearing end faces thereof are finished by machining with the bearing inner periphery as the standard, or with the outer periphery or the like being secured in concentricity to the bearing inner periphery as the standard. This, however, gives rise to such problems that: ① since chips and shavings produced in the machining adhere to the bearing inner periphery, cleaning needs to be performed after the machining; and ② the additional processes required such as the post machining and the cleaning produce a large increase in cost, thereby harming the reasonability in cost which is the greatest feature of hydrodynamic type oil-impregnated sintered bearings.

Accordingly, in the present invention, a forming die for forming a hydrodynamic pressure generating groove in a radial bearing surface is inserted into the inner periphery of a bearing body material, and a pressing force is applied to the bearing body material while holding both end faces of the bearing body material with a pair of punching surfaces, so that the forming die forms in the inner periphery of the bearing body material a radial bearing surface having the hydrodynamic pressure generating grooves slanting against an axial direction, and at least one of the punching surfaces forms in one end face of the bearing body material a thrust bearing surface constituting a thrust bearing section with a shaft; here, the squareness between the aforesaid at least one punching surface and the outer periphery of the forming die is set within 2 $\mu$m (desirably within 1 $\mu$m).

As a way to finish the punching surface and the forming die with a high degree of accuracy as mentioned above, the aforesaid one punching surface and the forming die may be constituted integrally. For example, it is possible to adopt such methods that the punch and the forming die are integrally made of an identical member by cutting, or that they are separately fabricated, and integrally fixed by a technique such as pressing-in before finished within 2 $\mu$m in squareness between the punching surface and the outer periphery of the forming die. The shaft and the flange portion may be integrally fabricated of an identical member, or they may be separately fabricated before one is pressed into the other, and then finished at a prescribed squareness.

After the bearing body material is formed in a prescribed dimension, the aforesaid forming die is desirably released from the inner periphery of the bearing body material by removing the pressing force to allow spring back of the bearing body material, and producing between the bearing body material and the forming die a difference in thermal expansion such that a difference in dimension widens between the inner diameter of the bearing body material and the outer diameter of the forming die. This avoids the interference between the forming die and the bearing body material, allowing the forming die to be drawn out of the inner periphery of the bearing body material without breaking the hydrodynamic pressure generating grooves formed.

The aforesaid difference in thermal expansion can be produced by, e.g., applying heat from the bearing body material side after the formation of the bearing surfaces. The forming die typically employs hard metal as its material, which has a coefficient of linear expansion of $5.1 \times 10^{-6}$ [1/° C.]. Meanwhile, the bearing body material consists mainly of powdered copper and powdered iron, having a coefficient of linear expansion of, for instance, $12.9 \times 10^{-6}$ [1/° C.]. Accordingly, when the bearing body material is heated to higher temperatures, the difference in dimension between the inner diameter of the bearing body material and the outer diameter of the forming die increases due to the difference in thermal expansion therebetween, facilitating the drawing of the forming die from the bearing body material.

In the aforesaid constitution, it is desirable that the bearing bore diameter d and the bearing length L of the hydrodynamic type oil-impregnated sintered bearing are set as $L \leq 1.2$ d, and the radial bearing surface is provided at one place on the bearing inner periphery. This can achieve thinner models of spindle motors.

In addition, a hydrodynamic pressure generating groove, for feeding oil, slanting against an axial direction may be provided in the bearing inner periphery of the hydrodynamic type oil-impregnated sintered bearing, so that the thrust bearing section is fed with oil by means of the hydrodynamic action produced in the hydrodynamic pressure generating groove. In the case where a bearing end face is a smooth surface having no hydrodynamic pressure generating groove, oil in the thrust bearing section is radially driven by the centrifugal action, possibly resulting in insufficient lubrication especially in high speed rotation and the like. In contrast, the provision of the above-mentioned hydrodynamic pressure generating groove facilitates the oil-film formation in the thrust bearing section to improve the lubricity. In addition, it remarkably lowers the wear in the thrust bearing section, greatly improving the durability.

In this connection, the oil fed to the thrust bearing section is absorbed through the bearing end face and the chambered portions into the inside of the bearing for recovery, and newly fed through the bearing inner periphery to the bearing clearance.

Moreover, in the aforesaid constitution, the thrust bearing section is desirably configured to support the shaft without contact by means of the hydrodynamic action produced in the relative rotation between the shaft and the bearing body. The non-contact support can eliminate the wear in the thrust bearing section to improve the durability yet greatly.

To be concretely, either of the aforesaid one bearing end face and the flange portion opposed thereto constituting the thrust bearing section may be provided with a hydrodynamic pressure generating section having a plurality of concave portions arranged circumferentially (desirably provided at three places or more). In this case, the concave portions serve as oil reservoirs; and when the oil in the concave portions is drawn out to adjacent convex portions with rotation, a pressure is generated, which can increase the film pressure to maintain the thrust bearing section stably in its non-contact state. The concave portions in the hydrodynamic pressure generating section may be hydrodynamic pressure generating grooves having portions slanting against imaginary radial lines drawn on the bearing end face. Here, with rotation, the oil in the thrust bearing section and peripheries thereof is accumulated to the inner periphery side to increase the film pressure, so that the thrust bearing section is maintained more stably in the non-contact state. A spiral-typed or a herringbone-typed shape may be applied to the hydrodynamic pressure generating grooves.

In the aforesaid constitution, it is desirable that the thrust bearing section is arranged at two places axially separated from each other. In this case, thrust loads in both directions can be supported, and the coming-out of the shaft can be prevented as well.

Furthermore, the rate of surface holes of the hydrodynamic type oil-impregnated sintered bearing is desirably set to be 10% or less (desirably 5% or less) in the radial bearing surface, and set to be 5% or less (desirably 2% or less) in the bearing end face constituting the thrust bearing section. The 10%-or-less rate of surface holes in the radial bearing surface can secure the circulation of oil while preventing a pressure drop. At the 5%-or-less rate of surface holes in the aforesaid bearing end face, the running-off of oil through surface holes with arising pressures can be avoided even in the cases where hydrodynamic pressure generating grooves are provided therein. The "surface hole" refers to a portion in which a pore in a porous article's texture opens at the external surface, and the "rate of surface holes" refers to an a real ratio of surface holes by unit area on the external surface.

According to the present invention, it becomes possible for a bearing end face to offer support in the thrust direction. This eliminates the change in shaft position due to a recess in the thrust washer created by the deformation and wear as in a pivot bearing, and makes it possible for even thinner models of the bearing to keep the moment rigidity high. Moreover, in the relative rotation of the shaft and the bearing body, the one bearing end face and the flange portion are out of uneven contact with each other, which yields a smaller torque loss, allowing the suppression of fluctuations in torque to achieve higher rotational accuracies required of information equipment.

In the cases where the thrust bearing section is axially arranged at two places, the axial movement of the rotating shaft can be restrained to improve the impact load characteristics. Particularly, in those cases where a read head and a disc are arranged via a slight gap as in a HDD device, the situation that the head bumps against the disc can be avoided even under an impact load.

Since being constituted of a porous article such as sintered metal alloy, the oil-impregnated sintered bearing can be worked with a high degree of accuracy at a lower cost. Moreover, the bearing being a porous article holds a larger amount of oil, and the circulation of the oil slows its deterioration for improved durability.

To achieve the foregoing objects, the present invention also provides a hydrodynamic type bearing having a radial bearing surface provided in the inner periphery of a bearing body, the radial bearing surface having hydrodynamic pressure generating grooves slanting against an axial direction, the radial bearing surface being opposed via a radial bearing clearance to the outer periphery of a shaft member to be supported, wherein a thrust bearing surface having hydrodynamic pressure generating grooves is formed on at least one end face of the bearing body, simultaneously with the radial bearing surface.

This hydrodynamic type bearing can be constituted by a bearing body formed of sintered metal and impregnated with oil, or a bearing body formed of soft metal.

A hydrodynamic type bearing unit according to the present invention comprises a shaft member having a flange portion, and any of the aforementioned hydrodynamic type bearings, wherein the aforesaid thrust bearing surface and the end face of the flange portion opposed thereto form a thrust bearing clearance.

The aforesaid hydrodynamic type bearing is fabricated in such a manner that a radial bearing surface and a thrust bearing surface each having hydrodynamic pressure generating grooves are simultaneously formed on the inner periphery and at least one end face of a bearing material by: arranging in the inner periphery portion of the bearing material a radial forming die for forming the hydrodynamic pressure generating grooves in the radial bearing surface; holding both end faces of the bearing material with a pair of punching surfaces, at least one of the punching surfaces being provided with a thrust forming die for forming the hydrodynamic pressure generating grooves in the thrust bearing surface; and, in this state, applying a pressing force to the bearing material.

According to the present invention, a hydrodynamic type bearing for non-contact supporting a shaft member in both the radial and thrust directions can be fabricated by a simple method, with a high degree of accuracy and at lower costs. Besides, the simultaneous formation of the radial bearing surface and the thrust bearing surface eliminates the possibility that a bearing surface formed in a preceding process suffers a decrease in accuracy during the following process as in the case of forming the both bearing surfaces in separate processes, and allows the respective bearing surfaces to be formed with a high degree of accuracy at lower costs.

The nature, principle and utility of the invention will become more apparent from the following detailed description when read in conjunction with the accompanying drawings.

BRIEF EXPLANATION OF THE DRAWINGS

In the accompanying drawings:

FIGS. 9(B) and 9(C) are bottom views;

DETAILED DESCRIPTION OF THE PREFERRED EMBODIMENTS

Hereinafter, the preferred embodiments of the present invention will be described with reference to the accompanying drawings.

Figure 1:
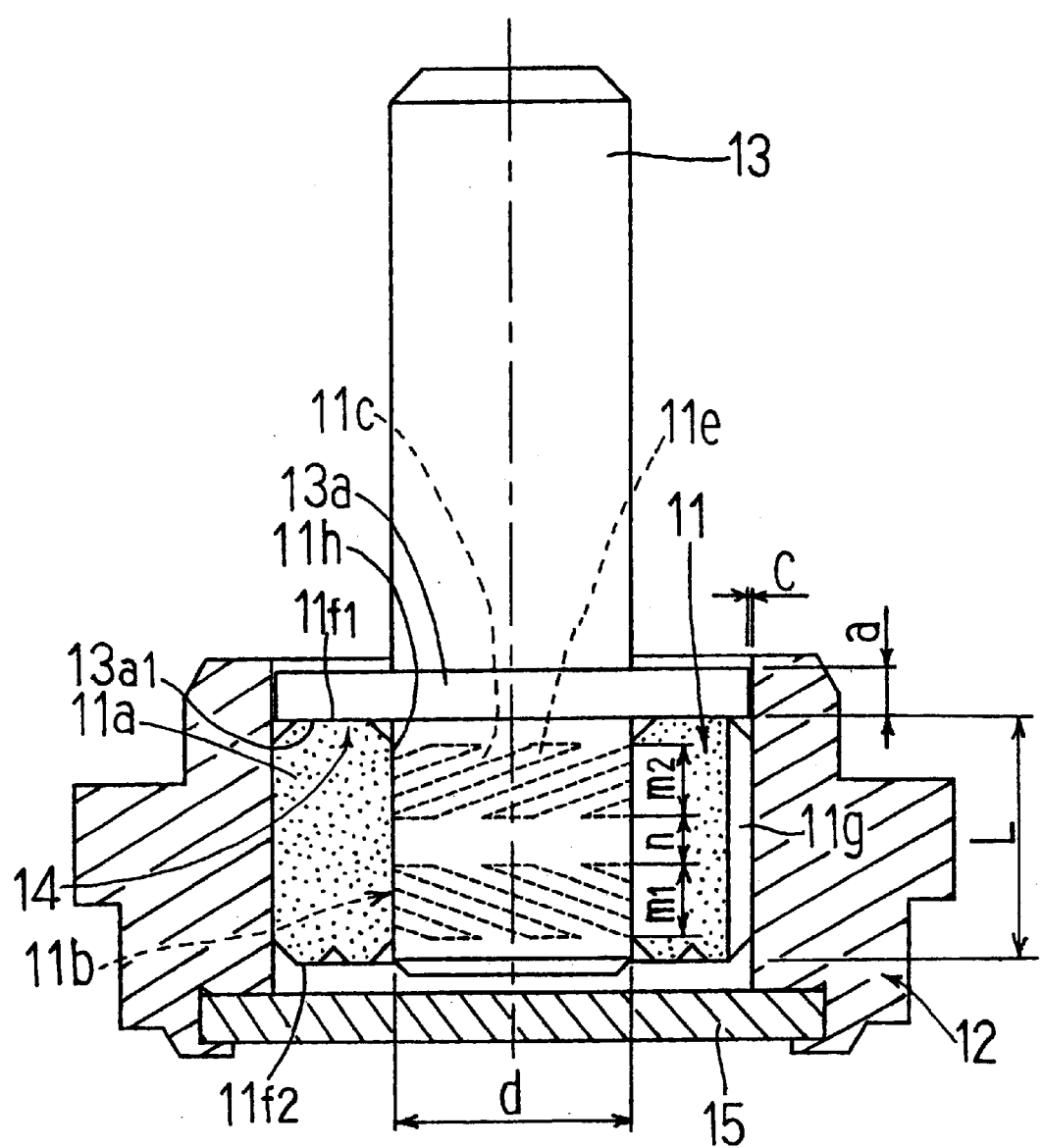
FIG. 1 is a cross-sectional view of a hydrodynamic type oil-impregnated sintered bearing unit according to the present invention.

FIG. 1 is a cross-sectional view of a hydrodynamic type oil-impregnated sintered bearing unit according to the present invention. The bearing unit comprises an oil-impregnated sintered bearing 11 of hydrodynamic type, a cylindrical housing 12 having the oil-impregnated sintered bearing 11 fixed to the bore portion thereof, and a rotating shaft 13 inserted into the bore portion of the oil-impregnated sintered bearing 11.

The hydrodynamic type oil-impregnated sintered bearing 11 is constituted by impregnating a cylindrical bearing body 11a composed of sintered metal with lubricating oil or lubricating grease, the bearing body 11a having a radial bearing surface 11b opposed to the outer periphery of the rotating shaft 13 via a bearing clearance. The sintered metal bearing body 11a is formed of sintered metal consisting mainly of a copper type, an iron type, or the both materials, and desirably employs copper at 20–95% by weight to range from 6.4 to 7.2 g/cm$^3$ in density. For use as the material of the bearing body 11a, cast iron, synthetic resins, ceramics, and the like may be sintered or foam molded into a porous article having a number of pores. The bearing body 11a preferably has the rate of surface holes not greater than 10% in its radial bearing surface 11b, and that not greater than 5% in the after-mentioned thrust bearing surfaces 11f1 and 11f2.

The bearing body 11a has only one radial bearing surface 11b provided on its inner periphery 11h. In the bearing surface 11b are circumferentially arranged and formed a plurality of hydrodynamic pressure generating grooves 11c (of herringbone type) slanting against the axial direction. As long as they are formed to slant against the axial direction, the hydrodynamic pressure generating grooves 11c may take any shape, e.g. of spiral type, other than that of herringbone type. In the outer periphery of the oil-impregnated sintered bearing 11 is/are formed along the axial direction a groove or a plurality of grooves 11g, each serving as an air vent in inserting the shaft 13 into the bore portion of the bearing 11. Incidentally, for thinner models of spindle motors, the bearing bore diameter d and the bearing length L are set to satisfy L≦1.2 d.

In the aforesaid oil-impregnated sintered bearing 11, the lubricant (the lubricating oil or the base oil of the lubricating grease) inside the bearing body 11a exudes out from the surfaces of the bearing body 11a due to the thermal expansion of the oil resulting from a rise in temperature and the generation of pressure caused by the rotation of the rotating shaft 13. The lubricant is then drawn into the bearing clearance by the action of the hydrodynamic pressure generating grooves 11c. The oil drawn into the bearing clearance forms a lubricating film to support the rotating shaft without contact. That is, when the aforesaid slanting hydrodynamic pressure generating grooves 11c are provided in the bearing surface 11b, the hydrodynamic action thereof draws the lubricant having exuded out of the bearing body 11a into the bearing clearance, and continuously drives the lubricant into the bearing surface 11b as well. This can increase the film pressure to improve the rigidity of the bearing. Incidentally, in assembling the bearing unit, the rotating shaft 13 is desirably inserted into the bearing 11 with the bearing clearance and peripheries of the bearing lubricated so as to be filled with oil.

When a positive pressure is generated in the bearing clearance, the holes existing in the bearing surface 11b cause the lubricant to flow back to the inside of the bearing body; however, since new lubricant is successively driven into the bearing clearance, the film pressure and the rigidity are maintained at high levels. The film formed here is continuous and stable, which offers a high rotational accuracy, and lowers shaft run-out, non repeatable run-out(NRRO), jitter, and the like. Besides, the rotating shaft 13 rotates without contact to the bearing body 11a, resulting in lower noise and lower costs as well.

The radial bearing surface 11b comprises a first groove region m1, a second groove region m2 provided so as to be axially separated from the first region m1, and an annular smooth region n positioned between the two groove regions m1 and m2. In the first groove region m1 are arranged hydrodynamic pressure generating grooves 11c slanting in one direction against the axial direction. In the second groove region m2 are arranged hydrodynamic pressure generating grooves 11c slanting in the other direction against the axial direction. The hydrodynamic pressure generating grooves 11c in the two groove regions m1 and m2 are sectioned by the smooth region n so as to be disconnected from each other. The smooth region n and the portions of ridges 11e between hydrodynamic pressure generating grooves 11c are at the same level. The hydrodynamic pressure generating grooves 11c of such discontinuous type offer the advantages that the accumulation of oil about the smooth region n yields a higher film pressure and that the groove-less smooth region n provides a higher bearing rigidity, as compared with hydrodynamic pressure generating grooves of continuous type, i.e., in which the smooth region n is omitted and hydrodynamic pressure generating grooves 11c in the both groove regions m1 and m2 are connected each other into continuous V-shaped grooves.

On one axial end side of the oil-impregnated sintered bearing 11 is provided a thrust bearing section 14. FIG. 1 shows the embodiment in which the thrust bearing section 14 is provided on the upper end side of the oil-impregnated sintered bearing 11. The upper bearing end face 11f1 (thrust bearing surface) of the oil-impregnated sintered bearing 11 and a disk-shaped flange portion 13a fixed to the rotating shaft 13 are opposed to each other to constitute the thrust bearing section 14. The rotating shaft 13 and the flange portion 13a are integrally made from an identical member, or are separately fabricated and then fit to each other. They are finished so that the outer periphery of the rotating shaft 13, especially at the portion opposed to the bearing surface 11b when attached to the bearing 11, has a squareness within 2 μm, desirably within 1 μm, with respect to the end face 13a1 of the flange portion 13a on the bearing 11 side.

Such thrust bearing section 14 offers surface contact to its slide-contacting portions. This avoids fluctuations in shaft position, which come into question in the cases of pivot bearings, and simultaneously enables even the single-row bearing surface 11b to increase the moment rigidity to support the shaft with a high degree of accuracy.

Figure 12:
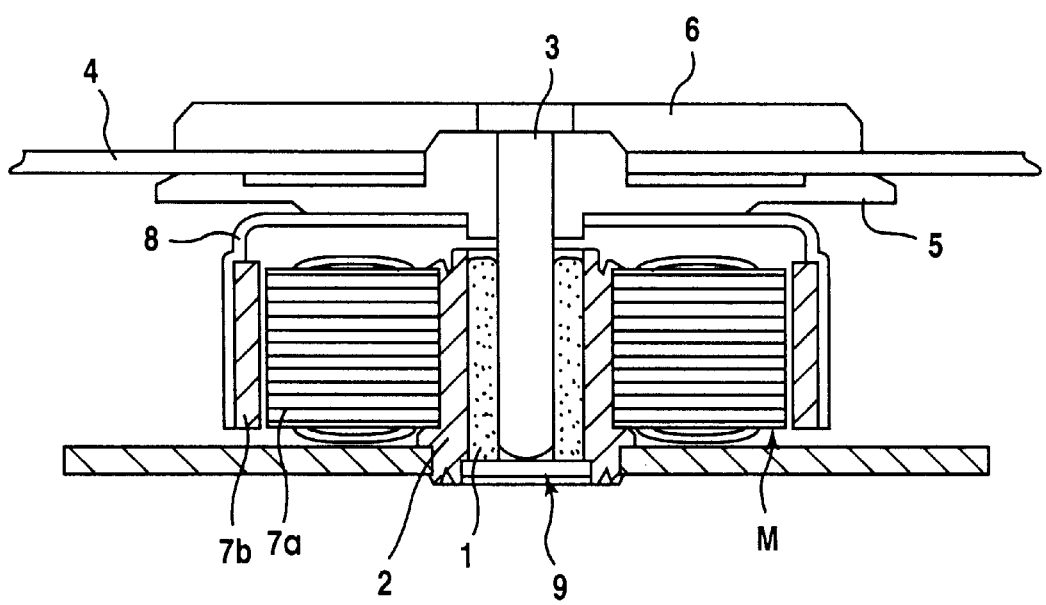
FIG. 12 is a cross-sectional view of an optical disc drive incorporating a hydrodynamic type oil-impregnated sintered bearing unit.
Figure 13:
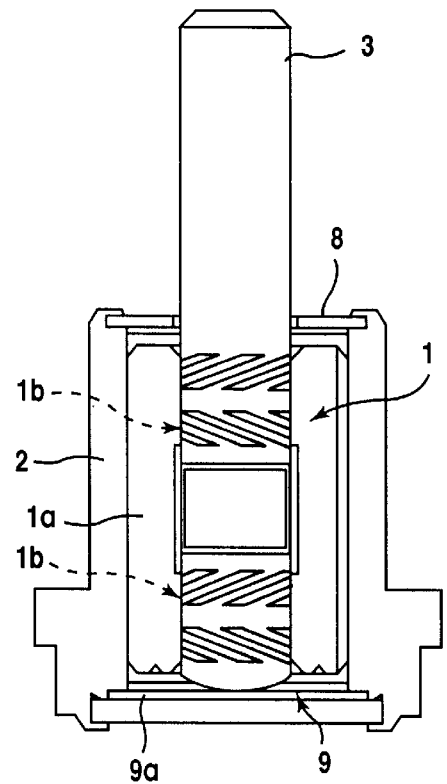
FIG. 13 is a cross-sectional view of a conventional hydrodynamic type oil-impregnated sintered bearing unit.
Figure 14:
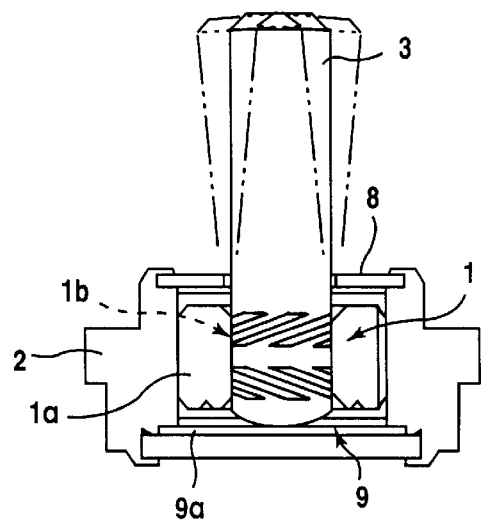
FIG. 14 is a cross-sectional view of a hydrodynamic type oil-impregnated sintered bearing unit.

Now, in the cases where the flange portion 13a is provided on the rotating shaft 13 as described above, it becomes difficult to seal the upper end of the bearing 11 with a conventional seal washer 5 (see FIG. 15) since parts such as a rotor case 8 and a turntable 5 (see FIG. 12) are fixed to the upper end of the rotating shaft 13. On this account, the oil leakage from the upper end of the bearing 11 is capillary sealed by a minute gap between the outer periphery of the flange portion 13a and the inner periphery of the housing 12. The sealing gap c is preferably 0.05 mm or less, desirably 0.02 mm or less, and the sealing length a is preferably 0.5 mm or more, desirably 1 mm or more. Oil repellent may be applied to the outer periphery of the flange portion 13a or the inner periphery of the housing 12 constituting the seal for more effective prevention of oil leakage.

Meanwhile, the oil leakage from the lower end side of the bearing 11 can be prevented, for example, by pressing a baseplate 15 into the bottom opening portion of the housing 12 and then caulking the same. The gap between the baseplate 15 and the housing 12 may be sealed by adhesive for more effective prevention of oil leakage.

Figure 2A:
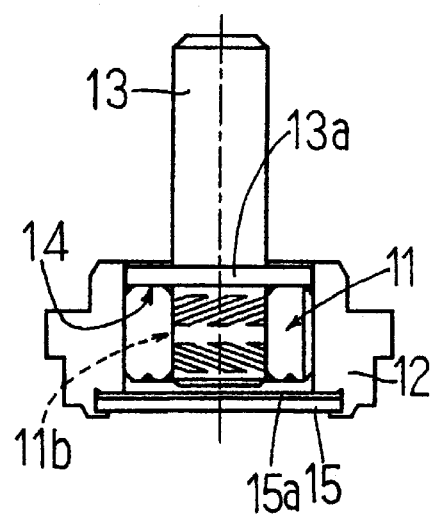
FIGS. 2(A) and 2(B) are cross-sectional views showing other embodiments of the present invention.

FIG. 2(A) shows an embodiment in which elastic material 15a such as resin or rubber is put over the baseplate 15 and used as packing to prevent the oil leakage from the baseplate 15 side. It is also desirable here, if needed, to caulk the baseplate 15 after being pressed into the housing 12.

Figure 2B:
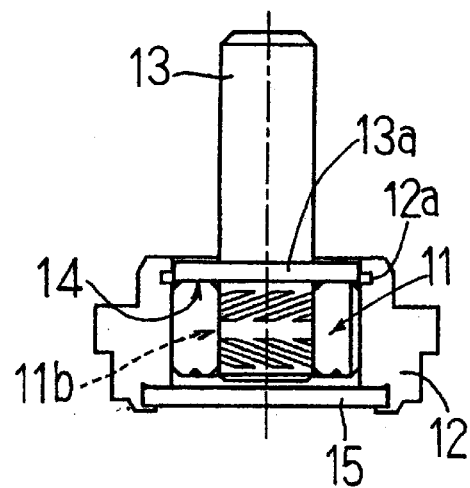

FIG. 2(B) shows an embodiment in which an annular concave portion 12a is provided in the inner periphery of the housing 12 at the area opposed to the outer periphery of the flange portion 13a. The rotation of the flange portion 13a accumulates oil into the concave portion 12a by the centrifugal force, enabling the secure prevention of the oil leakage from the upper end of the housing 12 (centrifugal sealing). Since the centrifugal sealing alone may allow oil leakage in the cases where the shaft position is sideways, the capillary sealing is desirably used in combination.

Figure 3A:
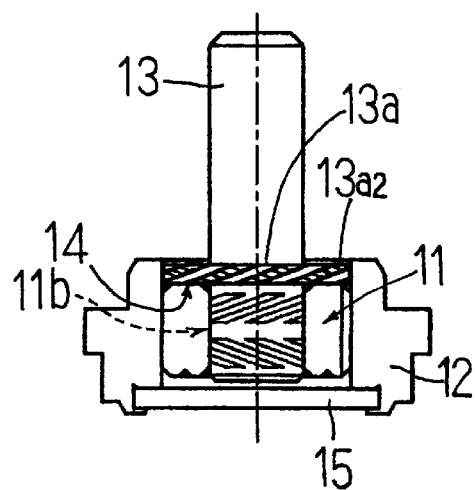
FIGS. 3(A) and 3(B) are cross-sectional views showing other embodiments of the present invention.

FIG. 3(A) shows an example in which the outer periphery of the flange portion 13a is provided with slanting grooves 13a2 that generate air streams toward the bearing 11 side when rotating. The air streams generated drive back oil to the bearing 11 side so that the oil leakage from the upper end of the bearing can be prevented (when not rotating, the capillary sealing prevents the oil leakage). Unlike the hydrodynamic pressure generating grooves 11c in the radial bearing surface 11b, the above-mentioned slanting grooves 13a2 need not be finished with a high degree of accuracy as long as they can prevent the oil leakage. The grooves have an appropriate depth on the order of 5–30 μm, and can be formed by techniques of rolling and the like.

Figure 3B:
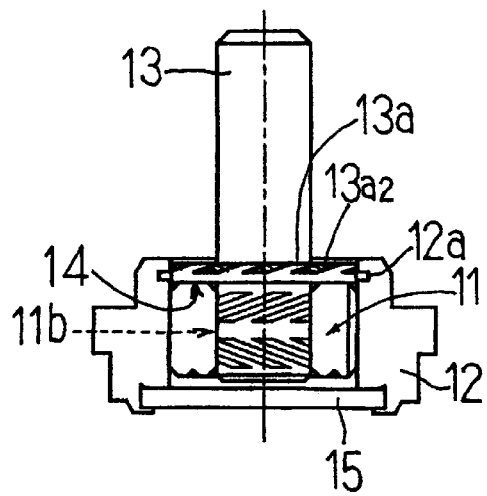

These slanting grooves 13a2, when formed to run through the width (axial dimension) of the flange portion 13a as shown in FIG. 3(A), sometimes feed excessive air into the bearing 11 side; therefore, they may be partially provided as shown in FIG. 3(B). In this case, it is desirable that the annular concave portion 12a is provided in the inner periphery of the housing 12 at the area opposed to the region having no slanting grooves 13a2 formed.

Figure 4:
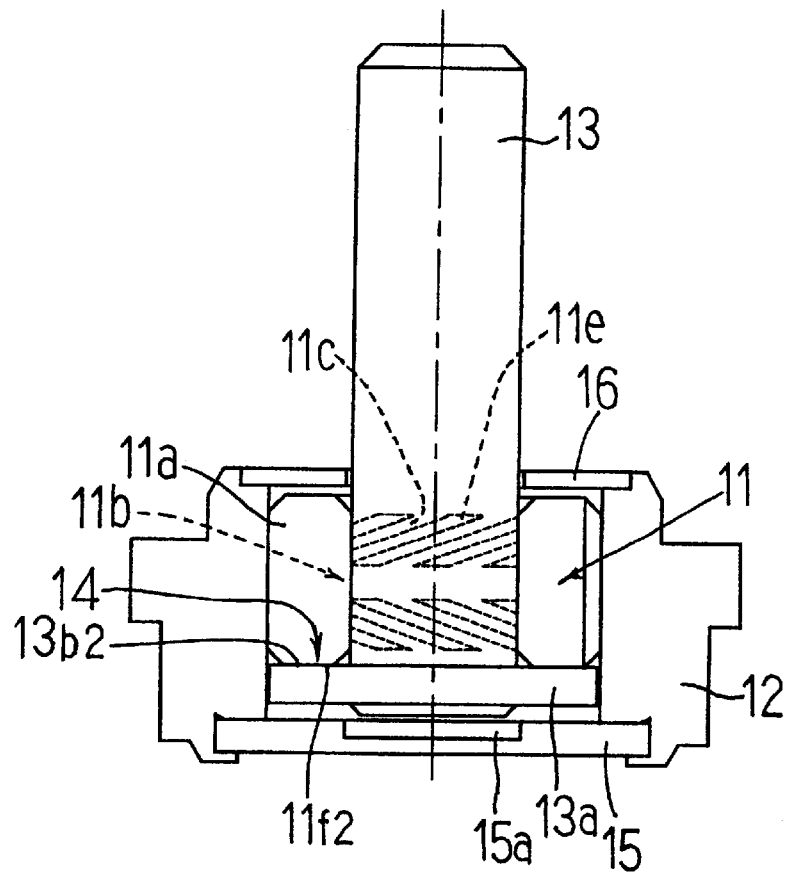
FIG. 4 is a cross-sectional view showing another embodiment of the present invention.

FIG. 4 shows an embodiment in which the thrust bearing section 14 is constituted by the lower bearing end face 11f2 of the bearing 11 and the flange portion 13a provided on the shaft end. When rotating, the rotating shaft 13 receives a floating force from the exciting force between the rotor 7b and the stator 7a (see FIG. 12) to float over the baseplate 15, and the thrust force is supported by the lower bearing end face 11f2 (thrust bearing surface) and the upper surface 13b2 of the flange portion 13b. In the upper surface of the baseplate 15 and immediately below the rotating shaft 13 is arranged a thrust washer 15a consisting of resin material or the like having high lubricity, so as to reduce the friction against the shaft end immediately after the start of and immediately before the stop of the motor. The top opening of the housing 12 is blocked with a seal washer 16 for preventing oil leakage, and the gap between the washer and the shaft is provided to be 0.2 mm or less to prevent the outward leakage of oil (capillary sealing). Oil repellent may be applied to the inner periphery of the seal washer 16, the upper and lower surfaces of the inner peripheral portion thereof, or the outer periphery of the shaft 13 facing the inner periphery of the seal washer 16, for more effective prevention of oil leakage.

Figure 5:
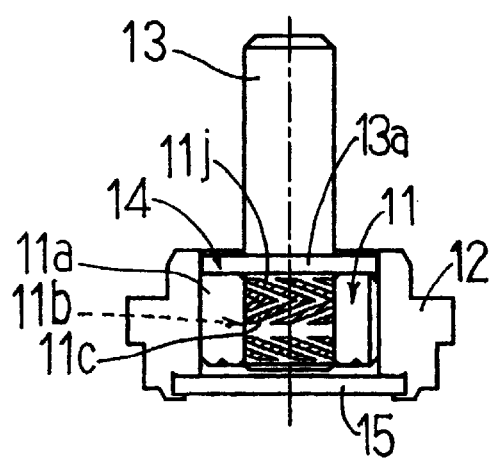
FIG. 5 is a cross-sectional view showing another embodiment of the present invention.

FIG. 5 shows an embodiment in which the bearing inner periphery 11h of the hydrodynamic type oil-impregnated sintered bearing 11 is provided with hydrodynamic pressure generating grooves 11j for oil supply slanting against the axial direction, so as to supply oil to the thrust bearing section 14 by means of the hydrodynamic action created by the hydrodynamic pressure generating grooves 11j. The hydrodynamic pressure generating grooves 11j are connected with the hydrodynamic pressure generating grooves 11c in the radial bearing surface 11b at the groove region (on the thrust bearing section 14 side), being formed into V-shapes. The provision of the hydrodynamic pressure generating grooves 11j for oil supply facilitates the formation of the oil film in the thrust bearing section 14 to improve the lubricity; in addition, it remarkably reduces wear in the thrust bearing section 14, greatly improving the durability.

FIGS. 6(A) through 7(B) show embodiments in which the thrust bearing section 14 is provided to non-contact support the rotating shaft 13 by means of the hydrodynamic action generated when rotating the rotating shaft 13. The non-contact support eliminates the friction in the thrust bearing section 14 to greatly improve the durability. The hydrodynamic action can be obtained by the provision of a hydrodynamic pressure generating section 17, which has a plurality of concave portions 11k arranged circumferentially in either of the bearing end face 11f1 and the flange portion 13a opposed thereto constituting the thrust bearing section 14. The concave portions 11k include, for example, hydrodynamic pressure generating grooves.

Figure 6A:
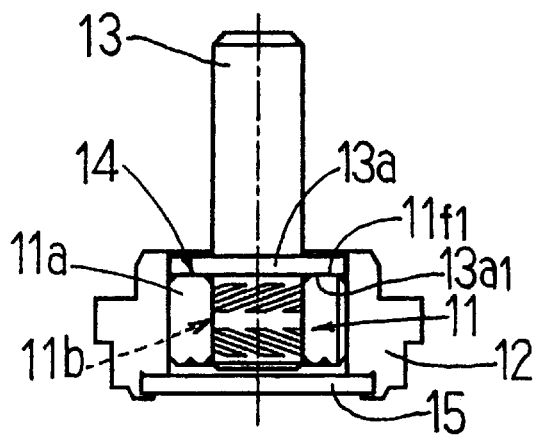
FIGS. 6(A) and 6(B) are views showing another embodiment of the present invention, FIG. 6(A) being a cross-sectional view and FIG. 6(B) being a plan view.
Figure 6B:
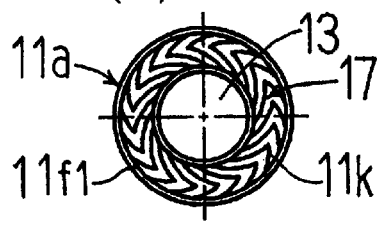

FIGS. 6(A) and 6(B) show an example of the thrust bearing section 14 having the hydrodynamic pressure generating section 17, in which the thrust bearing surface 11f1 is provided with hydrodynamic pressure generating grooves 11k having portions slanting against imaginary radial lines drawn on the bearing end face. The hydrodynamic pressure generating grooves 11k are of herringbone type, that is, of V-shapes having the curved sections generally at the radial intermediate portions thereof. The hydrodynamic pressure generating grooves are arranged and formed circumferentially at equal intervals. In this case, with rotation, the oil in the thrust bearing section 14 and peripheral portions thereof is accumulated about the curved sections to increase the film pressure, so that the thrust bearing section 14 can be stably maintained in its non-contact state. In addition to the herringbone type, the spiral type is also applicable to the shape of the hydrodynamic pressure generating grooves. Moreover, the hydrodynamic pressure generating grooves 11k may be provided in the end face 13a1 of the flange portion to form the thrust bearing surface 11f1 as a smooth surface having no hydrodynamic pressure generating groove.

Figure 7A:
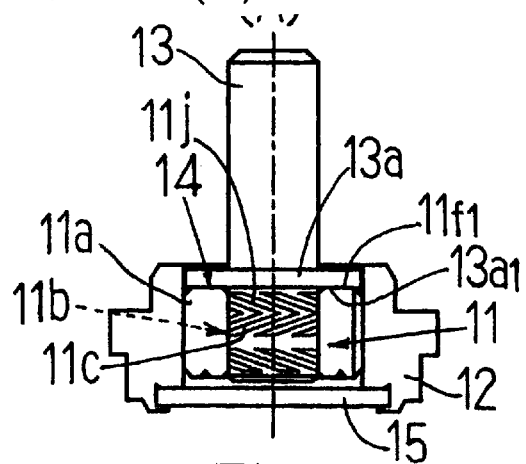
FIGS. 7(A) and 7(B) are views showing another embodiment of the present invention, FIG. 7(A) being a cross-sectional view and FIG. 7(B) being a plan view.
Figure 7B:
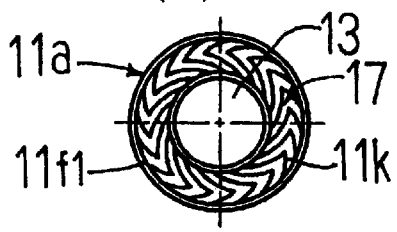

FIGS. 7(A) and 7(B) show an embodiment in which the hydrodynamic pressure generating grooves 11k are provided in the thrust bearing surface 11f1 as in FIGS. 6(A) and 6(B), and the hydrodynamic pressure generating grooves 11j for oil supply are provided in the bearing inner periphery as in FIG. 5.

Figure 8B:
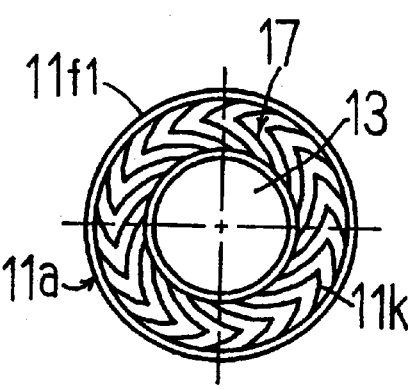
FIGS. 8(A), 8(B) and 8(C) are views showing another embodiment of the present invention, FIG. 8(A) being a cross-sectional view, FIG. 8(B) being a plan view, and FIG. 8(C) being a bottom view.
Figure 8C:
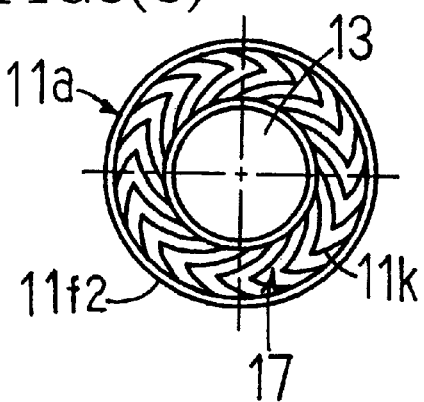
Figure 8A:
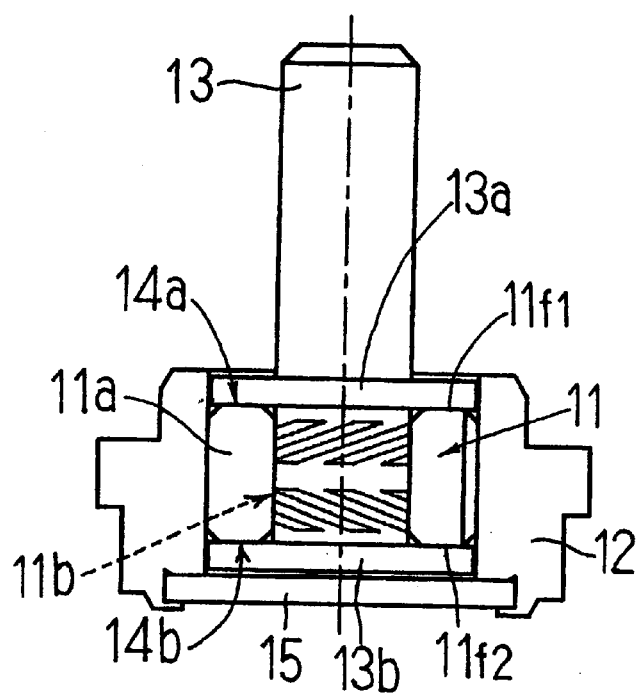

FIGS. 8(A) through 9(C) show embodiments in which thrust bearing sections 14a and 14b are provided at two places axially separated from each other, so as to support thrust loads in both directions. In FIGS. 8(A) to 8(C), flange portions 13a and 13b are arranged on both end sides of the bearing, so that the two thrust bearing sections 14a and 14b formed between the flange portions 13a, 13b and the both bearing end face 11f1, 11f2 can support the thrust loads in the both directions. As shown in FIGS. 8(B) and 8(C), in either the thrust bearing surfaces 11f1, 11f2 or end surfaces of the flange portions 13a, 13b opposed thereto both constituting the thrust bearing sections (in these figures, in the thrust bearing surfaces 11f1, 11f2) are formed the same hydrodynamic pressure generating grooves 11k as those in FIGS. 6(A) and 6(B). This configuration can not only offer the thrust support in the both directions, but also prevent the rotating shaft 13 from coming out of the bearing 11; therefore, damage to the motor can be avoided even when an impact load is imposed on the rotating shaft 13.

Figure 9B:
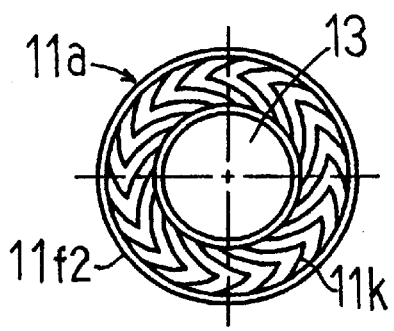
FIGS. 9(A), 9(B) and 9(C) are views showing another embodiment of the present invention, FIG. 9(A) being a cross-sectional view.
Figure 9A:
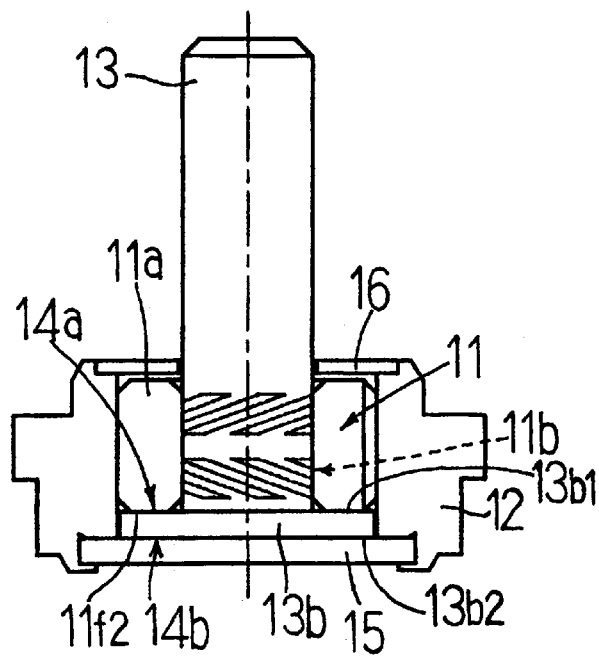
Figure 9C:
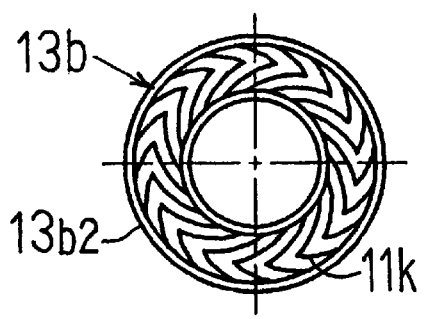

FIGS. 9(A) to 9(C) show an embodiment in which a flange 13b is provided between the bearing 11 and the baseplate 15, and the thrust bearing sections 14a and 14b are constituted on both sides of the flange portion 13b. That is, in either the upper end face 13b1 of the flange portion 13b or the lower bearing end face 11f2 and in either the lower end face 13b2 of the flange portion 13b or the upper surface of the baseplate 15 (in these figures, in the lower bearing end face 11f2 and in the lower end face 13b2 of the flange portion) are arranged the same hydrodynamic pressure generating grooves 11k as those in FIGS. 6(A) and 6(B), offering the same effect as that of the configuration in FIGS. 8(A) to 8(C).

The bearing body 11a of the aforesaid hydrodynamic type oil-impregnated sintered bearing 11 can be fabricated by applying, e.g., sizing, rotational sizing, and bearing surface molding to cylindrical sintered metal material (bearing body material) obtained by compression molding the aforesaid powdered metal and sintering the same.

The sizing process is a process for sizing the outer periphery and the inner periphery of the sintered metal material to correct the bend and the like generated in the sintering process, and is performed by pressing the outer periphery of the sintered metal material into a cylindrical die while pressing a sizing pin into the inner periphery of the material. The rotational sizing process is a process in which a rotational sizing pin of generally polygonal section (obtained by partially leveling the outer periphery of a circular-section pin, leaving arc portions at circumferential symmetric positions) is pressed against the inner periphery of the sintered metal material while the sizing pin is rotated to perform the sizing of the inner periphery. This rotational sizing corrects the inner periphery of the sintered metal material in roundness and cylindricity, and finishes the same at the rate of surface holes of, for example, 3–15%. The bearing surface molding process is a process in which a forming die having the shape corresponding to the bearing surface of a finished product is pressed against the inner periphery of the sintered metal material having had the sizing processes applied as described above, so as to simultaneously mold the forming region of the hydrodynamic pressure generating grooves and the other regions (the ridges 11$e$ and the annular smooth region n) on the bearing surface.

Figure 11:
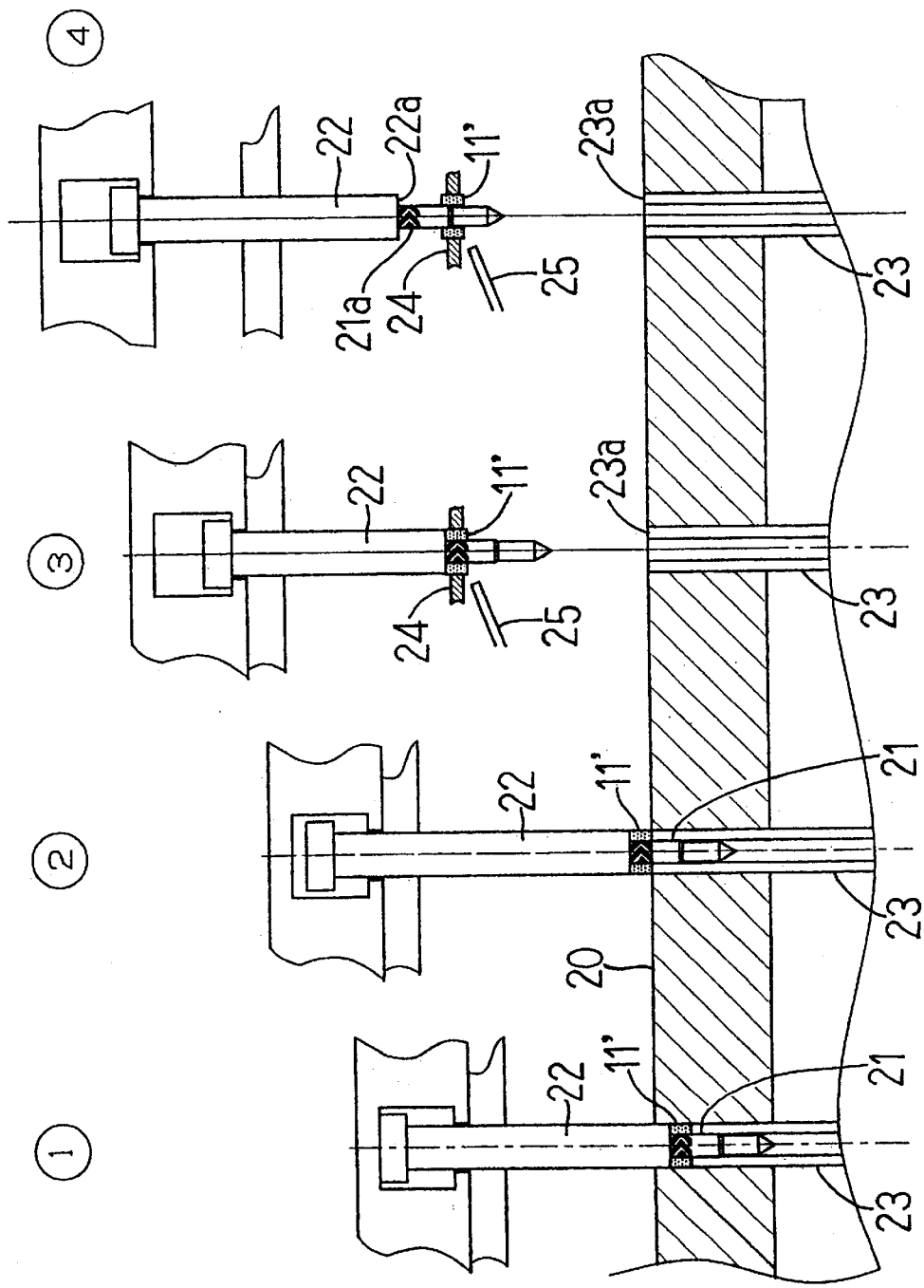
FIG. 11 is a sectional view showing the method of the present invention.

FIG. 11 illustrates by example the general configuration of a molding machine for use in the bearing surface molding process. This machine is composed mainly of: a cylindrical die 20 into which the outer periphery of sintered metal material 11' is pressed; a core rod 21 of hard metal for molding the inner periphery of the sintered metal material 11'; and upper and lower punches 22 and 23 for pressing both end faces of the sintered metal material 11' from above and below. The core rod 21 and the upper punch 22 are integrated, and the outer periphery of the core rod 21 and the punching surface of the upper punch 22 are finished within 2 $\mu$m in squareness.

Figure 10:
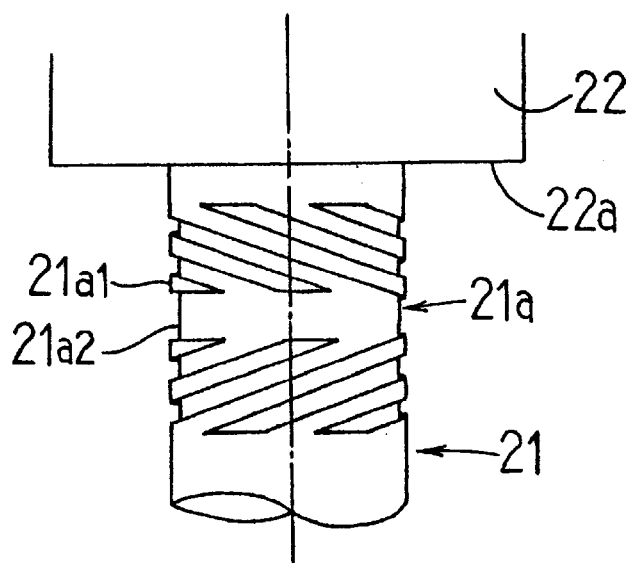
FIG. 10 is a side view of a core rod and an upper punch.

As shown in FIG. 10, the outer periphery of the core rod 21 is provided with a forming die 21$a$ having the concave and convex portions corresponding to the bearing surface 11$b$ of a finished product in shape. The convex portion 21$a$1 of the forming die 21$a$ is to form the regions of the hydrodynamic pressure generating grooves 11$c$ in the bearing surface 11$b$, and the concave portion 21$a$2 is to form the regions other than the hydrodynamic pressure generating grooves 11$c$ (the ridges 11$e$ and the annular smooth region n). The difference in dimension between the convex portions 21$a$1 and the concave portions 21$a$2 in the forming die 21$a$ is as nearly equally minute (for example, on the order of 2–5 $\mu$m) as the depth of the hydrodynamic pressure generating grooves 11$c$, while it is considerably exaggerated in the figure. In this connection, in the cases of providing the hydrodynamic pressure generating grooves 11$k$ in the upper and lower bearing end faces 11$f$1, 11$f$2 (see FIGS. 6(A) through 9(C)), the punching surfaces 22$a$, 23$a$ of the upper and lower punches 22, 23 are also provided with forming dies for transfer having the shapes corresponding to the aforesaid hydrodynamic pressure generating grooves 11$k$.

This molding machine performs the molding in accordance with the procedures ① to ④ shown in FIG. 11.

For a start, the sintered metal material 11' is positioned and placed on the upper surface of the die 20. Subsequently, the upper punch 22 and the core rod 21 are lowered, so that the sintered metal material 11' is pressed into the die 20 and then pressed against the lower punch 23 for compression from above and below ((①).

The sintered metal material 11' is deformed under the pressing forces from the die 20 and the upper and lower punches 22, 23, and the inner periphery thereof is pressed to the forming die 21$a$ on the core rod 21. This transfers the shape of the forming die 21$a$ to the inner periphery of the sintered metal material 11', molding the bearing surface 11$b$ in a prescribed shape and dimension (at the same time, the outer periphery and the both end faces of the sintered metal material 11' are sized as well).

After the molding of the bearing surface 11$b$ is completed, the upper and lower punches 22, 23 and the core rod 21 are simultaneously lifted while holding the physical relationship between the sintered metal material 11' and the core rod 21 (②), drawing the sintered metal material 11' out of the die 20. Subsequently, the outer periphery of the sintered metal material 11' being clamped by a clamper 24 is subjected to heated air from a heater 25 such as a heated air generator to heat the sintered metal material 11' (③), and then the sintered metal material 11' is released from the core rod 21 (④). Here, as soon as the sintered metal material 11' is drawn out of the die 20, the sintered metal material 11' yields spring back to expand in dimension of its inner diameter. Besides, the sintered metal material is elevated higher in temperature than the core rod 21 by the heating, and the sintered metal material 11' (consisting mainly of copper) is greater in coefficient of thermal expansion than the core rod 21 (made of hard metal alloy); therefore, the sintered metal material 11' further expands in the dimension of the inner diameter. Thus, the interference between the core rod 21 and the sintered metal material 11' is avoided, allowing the core rod 21 to be drawn out of the inner periphery of the sintered metal material 11' without breaking the hydrodynamic pressure generating grooves 11$c$. The heating process by the heater 25 may be omitted in the cases where the sintered metal material 11' is smoothly releasable merely by means of the spring back.

The sintered metal material 11' fabricated through the above-described processes is subjected to cleaning, and impregnated with lubricating oil or lubricating grease so as to hold oil, completing the hydrodynamic type sliding bearing (hydrodynamic type oil-impregnated porous bearing) shown in FIG. 1. This bearing 11 is fixed to the inner periphery of the housing 12 by e.g., adhesion. Incidentally, after the attachment of the bearing 11 to the housing 12, the bearing clearance and spaces around the bearing can be filled with oil, in addition to the impregnated oil, to greatly improve the lubricity.

When the squareness between the outer periphery of the core rod 21 and the punching surface 22$a$ of the upper punch 22 is set within 2 $\mu$m as described above, it becomes possible to provide the oil-impregnated sintered bearing 11 within 3 $\mu$m in squareness of the thrust bearing surface 11$f$1 with respect to the bearing inner periphery 11$h$. This bearing 11 and a rotating shaft 13 having the squareness between the flange portion 13$a$ and its outer periphery set in a prescribed range can be combined to avoid uneven contact in the thrust bearing section 14, achieving secure surface contact.

Figure 15:
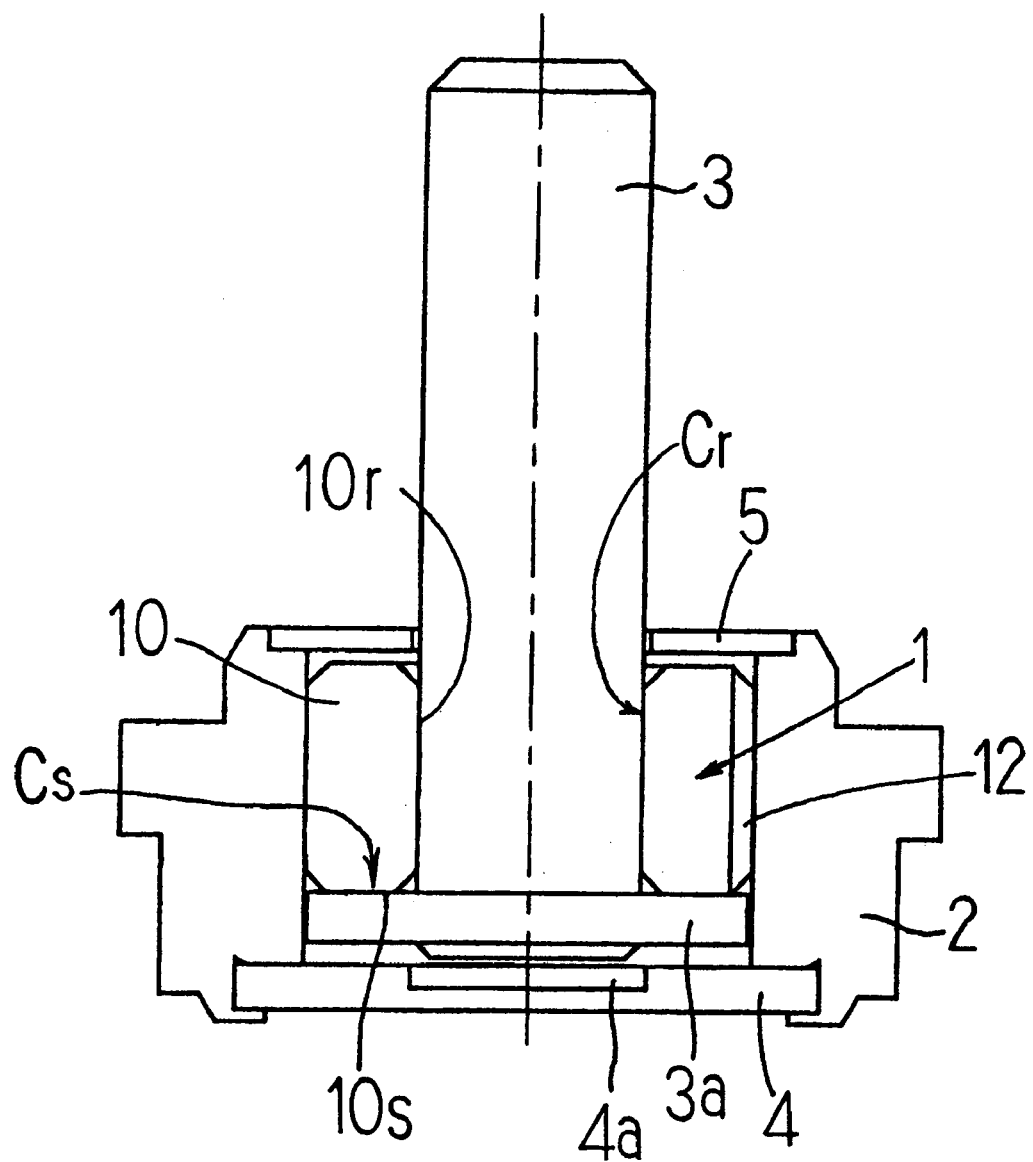
FIG. 15 is a cross-sectional view of a hydrodynamic type bearing unit according to the present invention.

FIG. 15 is a cross-sectional view of a hydrodynamic type bearing unit according to the present invention. This bearing unit comprises a hydrodynamic type bearing 1, a generally cylindrical housing 2 having the hydrodynamic type bearing 1 fixed to the bore portion thereof, and a shaft member 3 inserted into the bore portion of the hydrodynamic type bearing 1. On one end of the shaft member 3, an axially-projecting flange portion 3$a$ is provided by a method of integral molding, pressing-in of another member, or the like. This flange portion 3$a$ is arranged so as to be accommodated between a baseplate 4 sealing one opening of the housing 2 and one end face of the hydrodynamic type bearing 1. The other opening of the housing 12 is blocked with a sealing member 5 such as a seal washer to prevent outward leakage of oil.

The hydrodynamic type bearing 1 of this embodiment is a hydrodynamic type oil-impregnated sintered bearing in which its bearing body 10 composed of cylindrical sintered metal is impregnated with lubricating oil or lubricating grease. The bearing body 10 is formed of sintered metal consisting mainly of a copper type, an iron type, or the both materials, and desirably molded by using copper at 20–95% by weight.

Figure 16A:
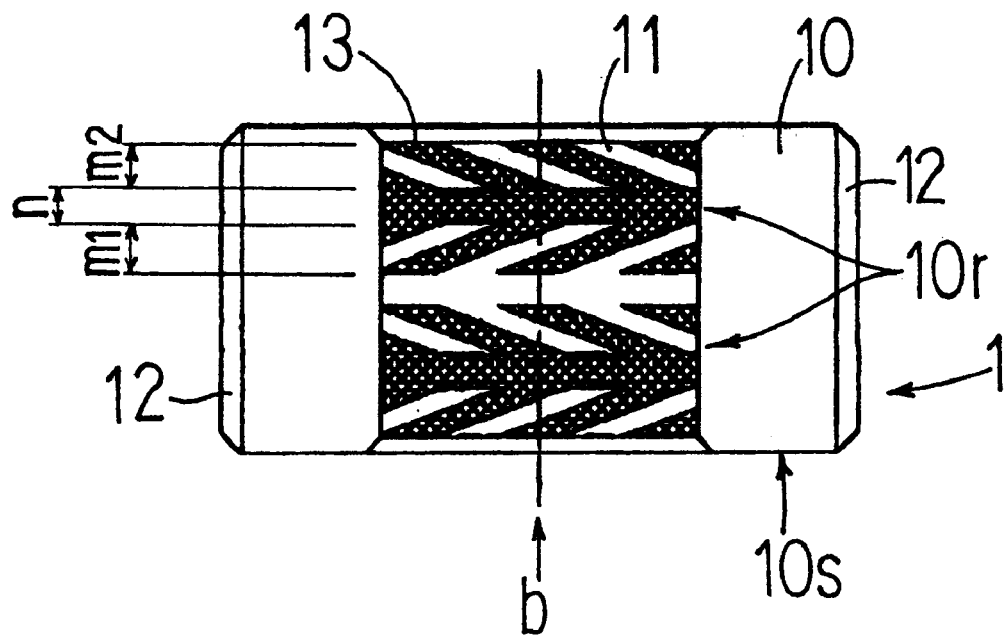
FIG. 16(A) is a cross-sectional view of a hydrodynamic type bearing according to the present invention.
Figure 16B:
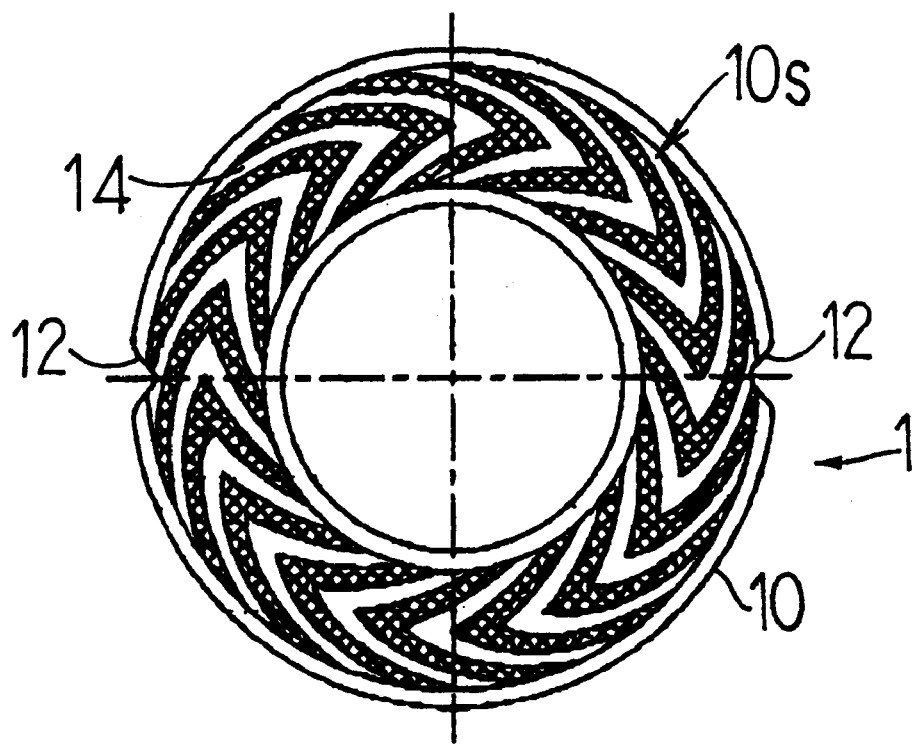
FIG. 16(B) is a plan view thereof as seen in the direction of b.

The inner periphery of the bearing body is provided with a radial bearing surface 10r, which radially supports without contact the shaft member 3 functioning as a rotating shaft. The radial bearing surface 10r is opposed to the outer periphery of the shaft member 3 via a radial bearing clearance Cr; the present embodiment illustrates a case in which a pair of radial bearing surfaces 10r are provided so as to be axially separated, as shown in FIGS. 16(A) and 16(B). In both the radial bearing surfaces 10r are circumferentially arranged and formed a plurality of hydrodynamic pressure generating grooves 11 (of herringbone type) slanting against the axial direction. As long as being formed to slant against the axial direction, the hydrodynamic pressure generating grooves 11 may take any shape, e.g. of spiral type, other than that of herringbone type. In the outer periphery of the oil-impregnated sintered bearing 1 is/are formed a groove or a plurality (two, in the figures) of grooves 12 along the axial direction. The grooves 12 function as air vents for securing air communication from the space enclosed with the bearing body 10 and the baseplate 4 to the exterior thereof when the hydrodynamic type bearing 1 is attached to the housing 2 as shown in FIG. 15.

The radial bearing surfaces 10r each comprises a first groove region m1, a second groove region m2 provided so as to be axially separated from the first region m1, and an annular smooth region n positioned between the two groove regions m1 and m2. In the first groove region m1 are arranged hydrodynamic pressure generating grooves 11 slanting in one direction against the axial direction. In the second groove region m2 are arranged hydrodynamic pressure generating grooves 11 slanting in the other direction against the axial direction. The hydrodynamic pressure generating grooves 11 in the two groove regions m1 and m2 are sectioned by the smooth region n so as to be disconnected from each other. The smooth regions n and the portions of ridges 13 between hydrodynamic pressure generating grooves 11 are at the same level. The hydrodynamic pressure generating grooves 11 of such discontinuous type offer the advantages that the accumulation of oil about the smooth regions n yields a higher film pressure and that the groove-less smooth regions n provide a higher bearing rigidity, as compared with hydrodynamic pressure generating grooves of continuous type, i.e., in which the smooth regions n are omitted and hydrodynamic pressure generating grooves 11 in the both groove regions m1 and m2 are connected each other into continuous V-shaped grooves.

In the aforesaid oil-impregnated sintered bearing 1, the lubricant (the lubricating oil or the base oil of the lubricating grease) inside the bearing body 10 exudes out from the surfaces of the bearing body 10 due to the thermal expansion of the oil resulting from the generation of pressure and a rise in temperature with the rotation of the shaft member 3. The lubricant is then drawn into the radial bearing clearance Cr by the action of the hydrodynamic pressure generating grooves 11. The oil drawn into the radial bearing clearance Cr forms a lubricating film to support the shaft member 3 without contact. That is, the hydrodynamic action of the aforesaid slanting hydrodynamic pressure generating grooves 11 draws the lubricant having exuded out of the bearing body 10 into the radial bearing clearance Cr, and continuously drives the lubricant into the radial bearing surfaces 10r as well. This can increase the film pressure to improve the rigidity of the bearing. When a positive pressure is generated in the radial bearing clearance Cr, the holes existing in the radial bearing surfaces 10r cause the lubricant to flow back to the inside of the bearing body 10; however, since new lubricant is successively driven into the radial bearing clearances 10r, the film pressure and the rigidity are maintained at high levels. The film formed here is continuous and stable, which offers a high rotational accuracy, and lowers shaft run-out, non repetitive readout overall (NRRO), jitter, and the like. Besides, the shaft member 3 rotates without contact to the bearing body 11a, resulting in lower noise and lower costs as well.

One end face of the bearing body 10 (the end face opposed to the flange portion 3a of the shaft member 3) is provided with a thrust bearing surface 10s, which has been molded simultaneously with the radial bearing surfaces 10r. In the thrust bearing surface 10s, a plurality of hydrodynamic pressure generating grooves 14 having portions slating against imaginary radial lines drawn on the bearing end face are arranged and formed circumferentially at equal intervals. In the present embodiment illustrates, those of herringbone type, i.e., of approximate V-shapes having the curved sections generally at the radial intermediate portions thereof are illustrated as an example of the hydrodynamic pressure generating grooves 14; however, any other shape can be applied thereto as long as meeting the above-mentioned conditions.

In the bearing unit shown in FIG. 15, the shaft member 3, when rotating, receives a floating force from the exciting force between the rotor 8 and the stator 7 (see FIG. 23) to float over the baseplate 4. Here, by the same action as described above, a hydrodynamic oil film is formed in a thrust bearing clearance Cs between the thrust bearing surface 10s and the end face of the flange portion 3a opposed thereto, so that the shaft member 3 is non-contact supported in the thrust direction. In the upper surface of the baseplate 4 and immediately below the shaft member 3 is arranged a thrust washer 4a consisting of resin material or the like having high lubricity, so as to reduce the friction against the shaft end immediately after the start of and immediately before the stop of the motor.

The bearing body 10 of the aforesaid hydrodynamic type oil-impregnated sintered bearing 1 can be fabricated by applying, e.g., sizing, rotational sizing, and bearing surface molding to cylindrical sintered metal material (bearing material) obtained by compression molding the aforesaid powdered metal and sintering the same.

The sizing process is a process for sizing the outer periphery and the inner periphery of the sintered metal material to correct the bend and the like generated in the sintering process, and is performed by pressing the outer periphery of the sintered metal material into a cylindrical die while pressing a sizing pin into the inner periphery of the material. The rotational sizing process is a process in which a rotational sizing pin of generally polygonal section (obtained by partially leveling the outer periphery of a circular-section pin, leaving arc portions at circumferential symmetric positions) is pressed against the inner periphery of the sintered metal material while the sizing pin is rotated to perform the sizing of the inner periphery. This rotational sizing corrects the inner periphery of the sintered metal material in roundness and cylindricity, and finishes the same at the rate of surface holes of, for example, 3–15%. The bearing surface molding process is a process in which forming dies having the shapes corresponding to the radial bearing surfaces 10r and the thrust bearing surface 10s are pressed against the inner periphery and at least one end face of the sintered metal material having had the sizing processes applied as described above, so as to simultaneously mold the regions of the hydrodynamic pressure generating grooves 14 and the other regions (for example, the ridges 13 and the annular smooth regions n in the radial bearing surfaces 10r) on the bearing surfaces 10r and 10s.

Figure 17:
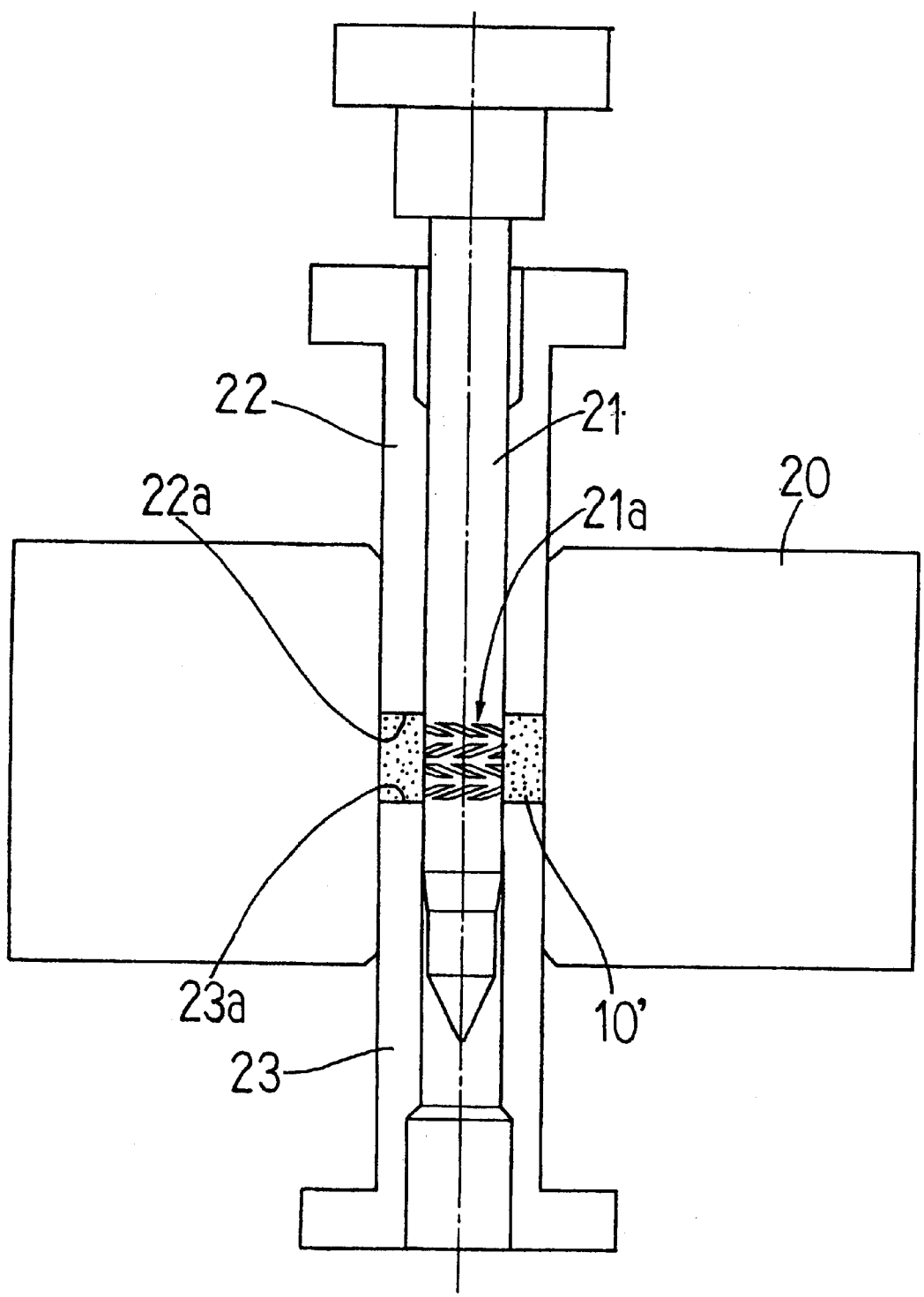
FIG. 17 is a schematic cross-sectional view of a molding machine for use in a bearing surface molding process.

FIG. 17 illustrates by example the general configuration of a molding machine for use in the bearing surface molding process. This machine is composed mainly of a cylindrical die 20 for molding the outer periphery of sintered metal material 10', a core rod 21 of hard metal for molding the inner periphery of the sintered metal material 10', and upper and lower punches 22 and 23 for pressing both end faces of the sintered metal material 10' from above and below.

Figure 18:
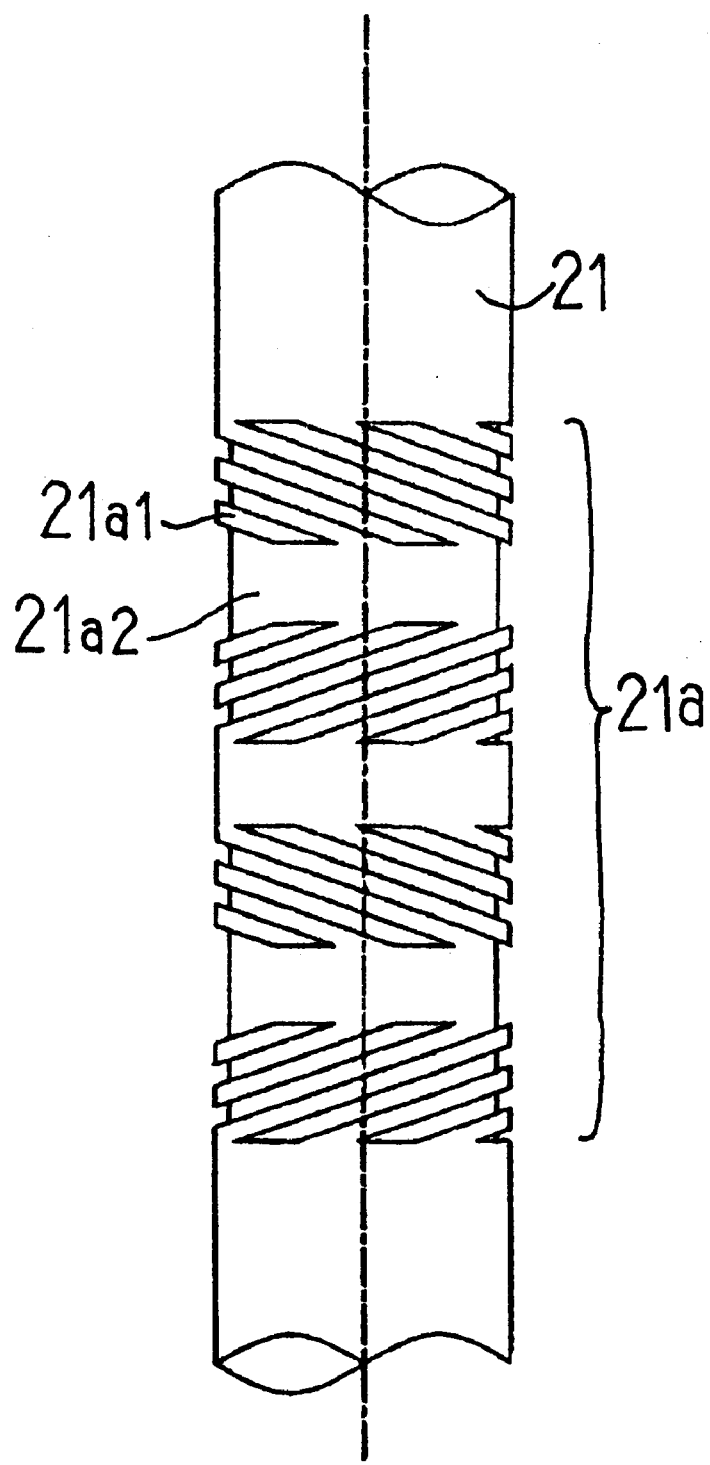
FIG. 18 is a front view of a core rod.
Figure 19:
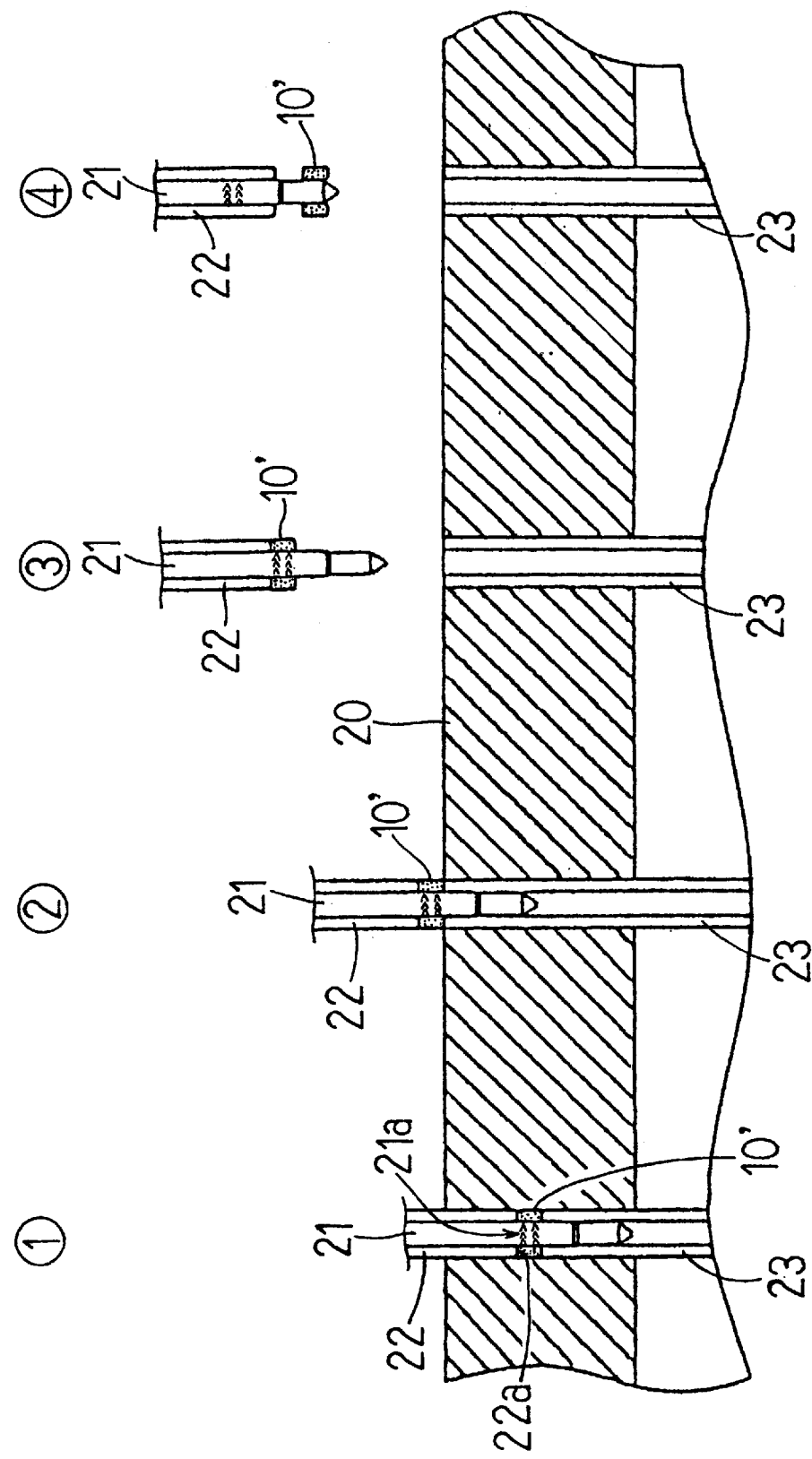
FIG. 19 is a cross-sectional view showing the bearing surface molding process.

As shown in FIG. 18, the outer periphery of the core rod 21 is provided with a forming die 21a (radial forming die) having the concave and convex portions corresponding to the pair of radial bearing surfaces 10r in shape. The convex portion 21a1 of the forming die 21a is to form the regions of the hydrodynamic pressure generating grooves 11 in the radial bearing surfaces 10r, and the concave portion 21a2 is to form the regions other than the hydrodynamic pressure generating grooves 11 (the ridges 13 and the annular smooth regions n). The difference in dimension between the convex portions 21a1 and the concave portions 21a2 in the forming die 21a is as nearly equally minute (for example, on the order of 2–5 μm) as the depth of the hydrodynamic pressure generating grooves 11 in the radial bearing surfaces 10r, while it is considerably exaggerated in the figure. Moreover, the punching surface of either one punch (for example, the upper punch 22) is provided with a forming die 22a (thrust forming die) having the concave and convex portions corresponding to the hydrodynamic pressure generating grooves 14 in the thrust bearing surface 10s. Which of the upper and lower punches 22, 23 the thrust forming die is provided on can be freely decided in accordance with such factors as the handleability of the work in subsequent processes, and a thrust forming die 23a may be provided in the lower punch 23 in contradiction to the above-described case. While the concrete shape of the thrust forming die 22a (or the thrust forming die 23a) is not illustrated, it will be understood that the thrust forming die forms the regions of the hydrodynamic pressure generating grooves 14 in the thrust bearing surface 10s with its convex portions, and forms the regions other than the hydrodynamic pressure generating grooves 14 with its concave portions, like the radial forming die 21a. This molding machine performs the molding in accordance with the procedures ① to ④ shown in FIG. 19.

For a start, the sintered metal material 10' is positioned and placed on the upper surface of the die 20. Subsequently, the upper punch 22 and the core rod 21 are lowered, so that the sintered metal material 10' is pressed into the die 20 and then pressed against the lower punch 23 for compression from above and below (①).

The sintered metal material 10' is deformed under the pressing forces from the die 20 and the upper and lower punches 22, 23, and the inner periphery and the one end face are pressed to the forming die 21a on the core rod 21 and the forming die 22a on the upper punch 22, respectively. This transfers the shapes of the forming dies 21a and 22a to the inner periphery and the one end face of the sintered metal material 10', simultaneously molding the radial bearing surfaces 10r and the thrust bearing surface 10s in prescribed shapes and dimensions (at the same time, the outer periphery and the both end faces of the sintered metal material 10' are sized as well).

After the molding of the both bearing surfaces 10r and 10s is completed, the upper and lower punches 22, 23 and the core rod 21 are lifted integrally while holding the physical relationship between the sintered metal material 10' and the core rod 21 (②), drawing the sintered metal material 10' out of the die 20. Subsequently, the outer periphery of the sintered metal material 10' is subjected to heated air from a heater such as a heated air generator to heat the sintered metal material 10' (③), and then the sintered metal material 10' is released from the core rod 21 (④). Here, as soon as the sintered metal material 10' is drawn out of the die 20, the sintered metal material 10' yields springback to expand in dimension of the inner diameter. Moreover, since the sintered metal material 10' is elevated higher in temperature than the core rod 21 by the heating and the sintered metal material 10' (consisting mainly of copper) is greater in coefficient of thermal expansion than the core rod 21 (made of hard metal alloy), the sintered metal material 10' further expands in the dimension of the inner diameter. Thus, the interference between the core rod 21 and the sintered metal material 10' is avoided, allowing the core rod 21 to be drawn out of the inner periphery of the sintered metal material 10' without breaking the hydrodynamic pressure generating grooves 11. The heating process by the heater may be omitted in the cases where the sintered metal material 10' is smoothly releasable merely by means of the springback.

The sintered metal material 10' fabricated through the above-described processes is subjected to cleaning, and impregnated with lubricating oil or lubricating grease so as to hold oil, completing the oil-impregnated sintered bearing 1 shown in FIGS. 16(A) and 16(B). This bearing 1 is fixed to the inner periphery of the housing 2 by e.g., adhesion. Incidentally, after the attachment of the bearing 1 to the housing 2, the respective bearing clearances Cr, Cs and spaces around the bearing can be filled with oil, in addition to the impregnated oil, to greatly improve the lubricity.

The forming of the bearing surfaces 10r, 10s by compression molding the sintered metal material 10' as described above can simplify the processes, lowering the production costs through the shortening of cycle time and the improvement in mass productivity. Moreover, merely performing the final process of bearing surface molding (hydrodynamic sizing) can readily produce hydrodynamic type bearings with a high degree of accuracy, facilitating the quality control. It is also easy to simultaneously mold the radial bearing surfaces 10r and the thrust bearing surface 10s; in this case, the problems can be avoided which rise in the cases of molding the bearing surfaces 10r, 10s in separate processes, that is, the problems of accuracy decrease in bearing surfaces molded in a preceding process, and the like.

FIGS. 20 through 23 show other embodiments employing the aforesaid hydrodynamic type oil-impregnated sintered bearing 1.

Figure 20:
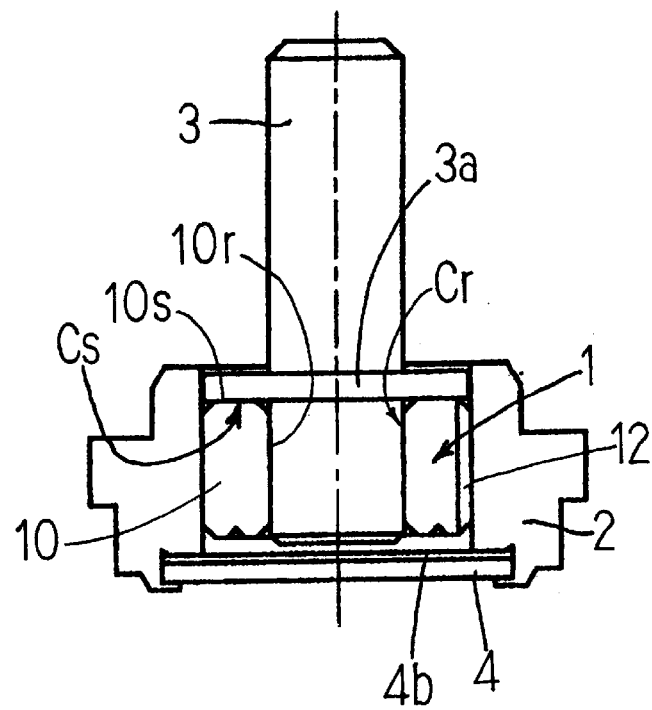
FIG. 20 is a cross-sectional view showing another embodiment of the hydrodynamic type bearing unit.

FIG. 20 shows an embodiment in which the other end face of the bearing body 10 (on the opening side of the housing 2) is provided with the above-mentioned thrust bearing surface 10s. Here, the thrust bearing clearance Cs is formed between the aforesaid thrust bearing surface 10s and the end face (lower end face) of the flange portion 3a arranged on the shaft member 3. In the figure, elastic material 4b such as resin or rubber is put over the baseplate 4 and used as packing to prevent the oil leakage through the joining portion between the baseplate 4 and the housing 2.

Figure 21:
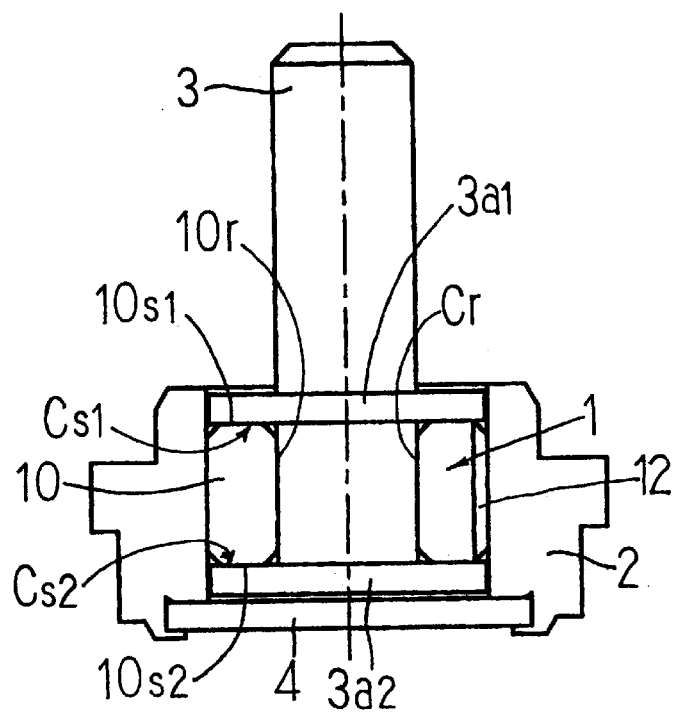
FIG. 21 is a cross-sectional view showing another embodiment of the hydrodynamic type bearing unit.

FIG. 21 shows an embodiment in which both end faces of the bearing body 10 are provided with thrust bearing surfaces 10s1 and 10s2, respectively. The both end faces of the bearing body 10 are opposed to end faces of two flange portions 3a1, 3a2, which are provided at two places on the shaft member 3, via thrust bearing clearances Cs1, Cs2, respectively. In this case, since the support of both-directional thrust loads is made possible and the shaft member 3 is prevented from coming out, damage to the motor can be avoided when an impact load is imposed on the shaft member 3. Thrust forming dies 22a, 23a having the concave and convex portions corresponding to the shapes of the hydrodynamic pressure generating grooves can be provided on the punching surfaces of the upper and lower punches 22, 23 in FIG. 17 so that the thrust bearing surfaces 10s1 and 10s2 are molded simultaneously with the radial bearing surfaces 10r by exactly the same procedures as those in FIG. 19.

Figure 22:
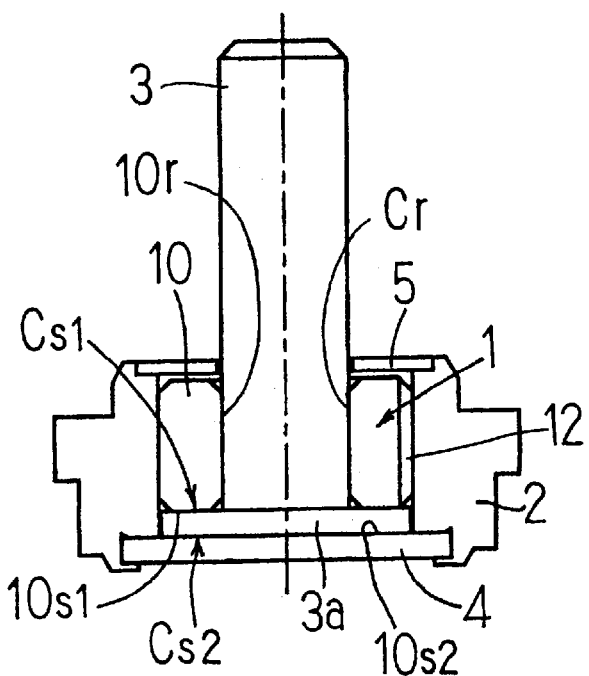
FIG. 22 is a cross-sectional view showing another embodiment of the hydrodynamic type bearing unit.

FIG. 22 shows an embodiment in which the aforesaid thrust bearing surface 10s1 is provided on one end face of the bearing body 10 (on the bottom side of the housing 2) as in FIG. 15, and such thrust bearing surface 10s2 is provided on either the opposing surfaces of the flange portion 3a or the baseplate 4 (for example, on the upper surface of the baseplate 4), offering the same effect as that of the configuration in FIG. 21.

Figure 23:
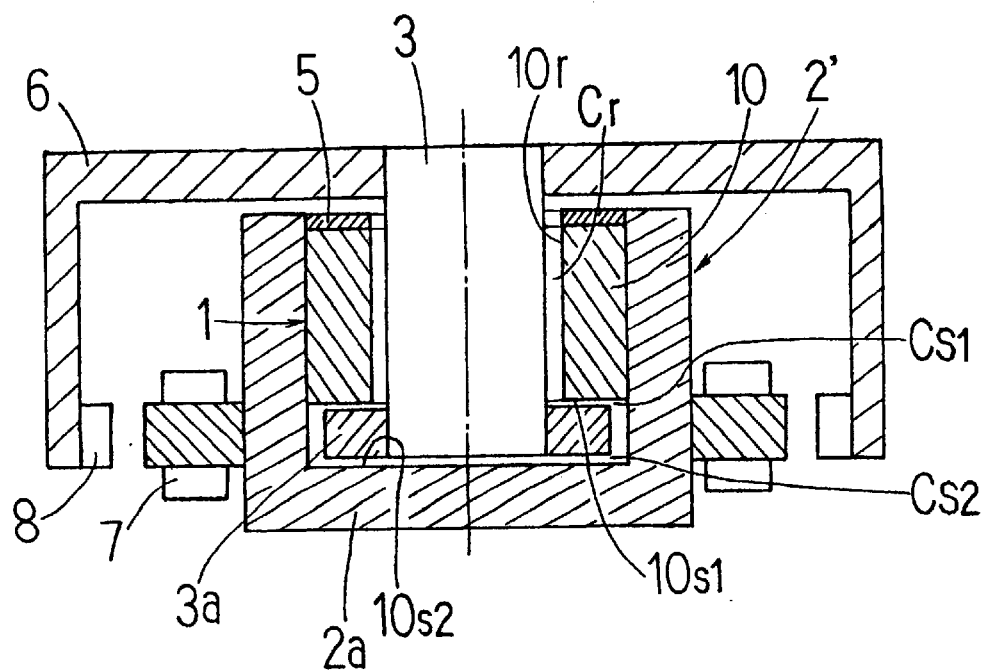
FIG. 23 is a cross-sectional view showing another embodiment of the hydrodynamic type bearing unit.

FIG. 23 shows an embodiment in which the housing 2 and the baseplate 4 shown in FIG. 22 are integrated into a closed-bottomed cylindrical housing 2' (bag-shaped housing). On one end face of the bearing body 10 and on either of the opposing surfaces of the flange portion 3a and a housing bottom surface 2a (for example, the housing bottom surface 2a) are provide the aforesaid thrust bearing surfaces 10s1 and 10s2 (here, the radial bearing clearance Cr and the thrust bearing clearances Cs1, Cs2 are shown exaggerated in width). Here, in addition to the same effect as that of the configuration in FIG. 21, further cost-lowering and the like can be achieved by the complete prevention of the oil leakage through the joining portion between the baseplate 4 and the housing 2, and by the reduction of the number of component parts. Such bag-shaped housing 2' can be applied to the bearing units in FIGS. 15, 20, and 21 to offer the same effect. In the figure, the reference numeral 6 designates a disc hub holding an optical disc or the like and being connected to the top end of the shaft member 3, the reference numeral 7 a motor stator fixed to the bag-shaped housing 2', and the reference numeral 8 a motor rotor fixed to the disc hub 6.

While the above description has illustrated by examples the cases in which the bearing body 10 is formed of sintered metal, the present invention is also applicable in the case where the bearing body 10 is formed of soft metals such as aluminum, brass, and bronze. Here, the radial bearing surfaces 10r and the thrust bearing surface 10s can be simultaneously molded by the same procedures as those shown in FIGS. 17 through 19. In a case where the bearing material, after the bearing surface molding, is hard to release from the core rod 21, the bearing material should be heated at the process ③. Here, lubricating oil is filled into the radial bearing clearance Cr and the thrust bearing clearance Cs as the lubricant.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A hydrodynamic type oil-impregnated sintered bearing unit comprising a shaft and a hydrodynamic type oil-impregnated sintered bearing including a bearing body formed of sintered metal, said bearing body being provided with a radial bearing surface opposed to an outer periphery of said shaft via a bearing clearance and being impregnated with oil, said hydrodynamic type oil-impregnated sintered bearing supporting said shaft without contact by means of hydrodynamic action produced on said radial bearing surface in a relative rotation between said shaft and said bearing body, wherein:

at least one bearing end face of said hydrodynamic type oil-impregnated sintered bearing and a flange portion provided on said shaft constitute a thrust bearing section; and a squareness between said one bearing end face and a bearing inner periphery and a squareness between said flange portion and the outer periphery of said shaft are controlled to a tolerance that said one bearing end face and said flange portion are kept out of uneven contact with each other in a relative rotation between said shaft and said bearing body.

2. The hydrodynamic type oil-impregnated sintered bearing unit according to claim 1, wherein:

the squareness between said one bearing end face and the bearing inner periphery is set within 3 $\mu$m; and the squareness between said flange portion and the outer periphery of said shaft is set within 2 $\mu$m.

3. The hydrodynamic type oil-impregnated sintered bearing unit according to claim 1 or 2, wherein:

a bearing bore diameter d and a bearing length L of said hydrodynamic type oil-impregnated sintered bearing are set as $L \leq 1.2d$; and said radial bearing surface is provided at one place on the bearing inner periphery.

4. The hydrodynamic type oil-impregnated sintered bearing unit according to claim 1 or 2, wherein:

a hydrodynamic pressure generating groove, for feeding oil, slanting against an axial direction is provided in the bearing inner periphery of said hydrodynamic type oil-impregnated sintered bearing, so that said thrust bearing section is fed with oil by means of hydrodynamic action produced in said hydrodynamic pressure generating grooves.

5. The hydrodynamic type oil-impregnated sintered bearing unit according to claim 1 or 2, wherein said thrust bearing section supports said shaft without contact by means of hydrodynamic action produced in the relative rotation between said shaft and said bearing body.

6. The hydrodynamic type oil-impregnated sintered bearing unit according to claim 5, wherein either of said one bearing end face and said flange portion opposed thereto constituting said thrust bearing section is provided with a hydrodynamic pressure generating section having a plurality of concave portions arranged circumferentially.

7. The hydrodynamic type oil-impregnated sintered bearing unit according to claim 6, wherein said concave portions in said hydrodynamic pressure generating section are hydrodynamic pressure generating grooves having portions slanting against imaginary radial lines drawn on said bearing end face.

8. The hydrodynamic type oil-impregnated sintered bearing unit according to claim 1 or 2, wherein said thrust bearing section is axially arranged at two places to support thrust loads in both directions.

9. The hydrodynamic type oil-impregnated sintered bearing unit according to claim 1 or 2, wherein a rate of surface holes of said hydrodynamic type oil-impregnated sintered bearing is set to be 10% or less in said radial bearing surface, and set to be 5% or less in said bearing end face constituting said thrust bearing section.

10. A hydrodynamic type bearing having a radial bearing surface provided in an inner periphery of a bearing body, said radial bearing surface having a hydrodynamic pressure generating groove slanting against an axial direction, said radial bearing surface being opposed via a radial bearing clearance to an outer periphery of a shaft member to be supported, wherein a thrust bearing surface having a hydrodynamic pressure generating groove is formed on at least one end face of said bearing body, simultaneously with said radial bearing surface, wherein both of said radial bearing surface and said thrust bearing surface are pressed surfaces formed by a forming die having a shape corresponding to the bearing surface of a finished product.

11. The hydrodynamic type bearing according to claim 10, wherein said bearing body is formed of sintered metal and impregnated with oil.

12. The hydrodynamic type bearing according to claim 10, wherein said bearing body is formed of soft metal.

13. A hydrodynamic type bearing unit comprising a shaft member having a flange portion, and a hydrodynamic type bearing according to any one of claims 10 through 12, wherein said thrust bearing surface and the end face of said flange portion opposed thereto form a thrust bearing clearance.

* * * * *